(12) United States Patent
Kitagawa et al.

(10) Patent No.: US 12,325,903 B2
(45) Date of Patent: *Jun. 10, 2025

(54) ALLOY NANOPARTICLE, AGGREGATE OF ALLOY NANOPARTICLES, CATALYST, AND METHOD FOR PRODUCING ALLOY NANOPARTICLES

(71) Applicant: KYOTO UNIVERSITY, Kyoto (JP)

(72) Inventors: Hiroshi Kitagawa, Kyoto (JP); Kohei Kusada, Kyoto (JP); Dongshuang Wu, Kyoto (JP)

(73) Assignee: KYOTO UNIVERSITY, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/630,731

(22) PCT Filed: Jul. 28, 2020

(86) PCT No.: PCT/JP2020/028834
§ 371 (c)(1),
(2) Date: Jan. 27, 2022

(87) PCT Pub. No.: WO2021/020377
PCT Pub. Date: Feb. 4, 2021

(65) Prior Publication Data
US 2022/0258231 A1  Aug. 18, 2022

(30) Foreign Application Priority Data

Jul. 29, 2019 (JP) ................................. 2019-138940
Jul. 6, 2020 (JP) ................................. 2020-116149

(51) Int. Cl.
*B22F 1/18* (2022.01)
*B01J 23/40* (2006.01)
(Continued)

(52) U.S. Cl.
CPC ................. *C22C 5/04* (2013.01); *B01J 23/46* (2013.01); *B22F 1/00* (2013.01); *B22F 1/054* (2022.01);
(Continued)

(58) Field of Classification Search
None
See application file for complete search history.

(56) References Cited

U.S. PATENT DOCUMENTS 10,639,723 B2 * 5/2020 Kitagawa ............... F01N 3/2803
2010/0285952 A1 * 11/2010 Hofinger ................... B01J 23/42
977/773

(Continued)

FOREIGN PATENT DOCUMENTS

CN 116926596 A * 10/2023
JP 2003-146617 A 5/2003
(Continued)

OTHER PUBLICATIONS

English translation of JP 2008-212918 (originally published Sep. 18, 2008), obtained from PE2E search.*
(Continued)

*Primary Examiner* — George Wyszomierski
(74) *Attorney, Agent, or Firm* — FISHERBROYLES, LLP; Roger L. Browdy

(57) ABSTRACT

A novel alloy nanoparticle which the alloy nanoparticle contains five or more types of elements, in the case where the alloy nanoparticle is directly supported on a carbon material carrier, the carbon material carrier excludes graphene or carbon fibers; an aggregate of alloy nanoparticles; a catalyst; a production method for alloy nanoparticles.

16 Claims, 13 Drawing Sheets

(51) Int. Cl.
*B01J 23/46* (2006.01)
*B22F 1/00* (2022.01)
*B22F 1/054* (2022.01)
*B22F 9/24* (2006.01)
*C22C 5/04* (2006.01)
*H01M 4/92* (2006.01)
*B22F 1/102* (2022.01)

(52) U.S. Cl.
CPC ............... *B22F 9/24* (2013.01); *H01M 4/92* (2013.01); *B22F 1/102* (2022.01); *B22F 1/18* (2022.01)

(56) References Cited

U.S. PATENT DOCUMENTS

| | | | |
|---|---|---|---|
| 2012/0288430 A1* | 11/2012 | Bello | B01J 23/8913 423/247 |
| 2018/0207728 A1* | 7/2018 | Teramoto | B82Y 40/00 |
| 2018/0214859 A1* | 8/2018 | Qi | B01J 37/0242 |
| 2019/0161840 A1* | 5/2019 | Yao | B22F 9/24 |
| 2021/0163707 A1* | 6/2021 | Mirkin | C21D 1/40 |
| 2021/0178477 A1* | 6/2021 | Hur | B01J 23/40 |
| 2021/0197267 A1* | 7/2021 | Hur | B22F 1/07 |

FOREIGN PATENT DOCUMENTS

| | | | |
|---|---|---|---|
| JP | 2008212918 A * | 9/2008 | |
| JP | 2010-534130 A | 11/2010 | |
| JP | 2016-511920 A | 4/2016 | |
| JP | 2017-013040 A | 1/2017 | |
| JP | 2017-098848 A1 | 11/2018 | |
| WO | 2009/013540 A2 | 1/2009 | |
| WO | 2009/013540 A3 | 1/2009 | |
| WO | 2014/122427 A1 | 8/2014 | |
| WO | 2017/150596 A1 | 9/2017 | |
| WO | 2018/159505 A1 | 9/2018 | |
| WO | WO-2023/198617 A2 * | 10/2023 | |

OTHER PUBLICATIONS

Rekha et al., First report on high entropy alloy nanoparticle decorated graphene, Scientific Reports (2018) 8:8737.
Yao et al., Carbothermal shock synthesis of high-entropy-alloy nanoparticles, Science, 2018, 1489-1494.
Waag et al., Kinetically-controlled laser-synthesis of colloidal high-entropy alloy nanoparticles, RSC Adv. (2019) 9:18547-18558.
Bondesgaard et al., General Solvothermal Synthesis Method for Complete Solubility Range Bimetallic and High-Entropy Alloy Nanocatalysts, Adv. Funct. Mater. (2019) 1905933:1-9.
International Search Report and Written Opinion issued in PCT/JP2020/028834 dated Oct. 6, 2020.
Japanese and English version of International Preliminary Report on Patentability of Chapter II issued in PCT/JP2020/028834 dated Feb. 3, 2022.
Extended European Search Report dated Jul. 14, 2023 issued in the corresponding European patent application No. 20847787.7.
Liu et al., "Entropy-Maximized Synthesis of Multimetallic Nanoparticle Catalysts via a Ultrasonication-Assisted Wet Chemistry Method under Ambient Conditions", Advanced Materials Interfaces, 2019, vol. 6, No. 7, p. 1900015.
Office Action dated Jul. 30, 2024 issued in the corresponding Japanese patent application No. 2021-535350 with its English Machine Translation.

* cited by examiner

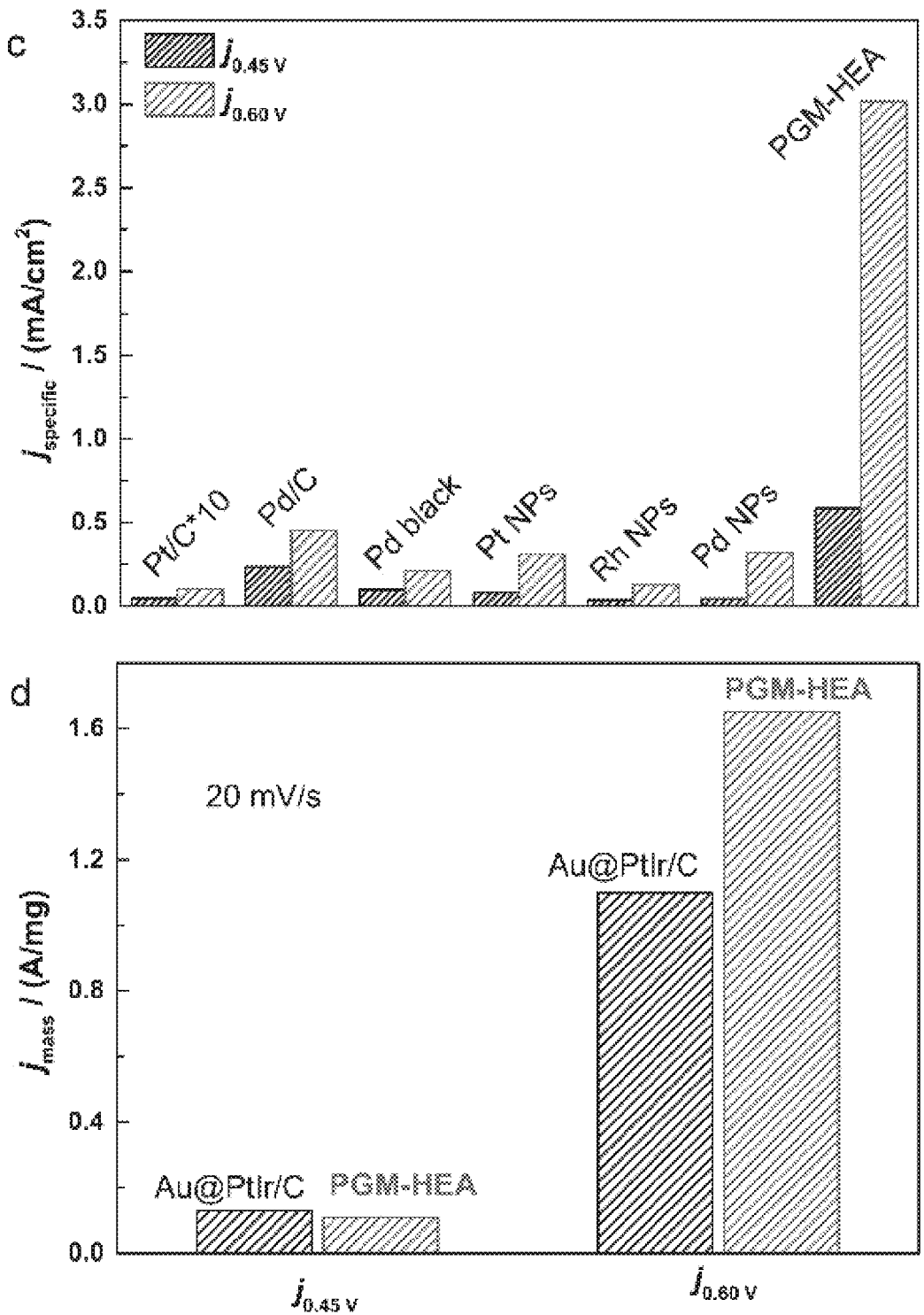

ALLOY NANOPARTICLE, AGGREGATE OF ALLOY NANOPARTICLES, CATALYST, AND METHOD FOR PRODUCING ALLOY NANOPARTICLES

CROSS-REFERENCE TO RELATED APPLICATIONS

This application is a Continuation of PCT International Application No. PCT/JP2020/028834, filed on Jul. 28, 2020, which claims priority under 35 U.S.C. Section 119(a) to Japanese Patent Application No. 2019-138940 filed on Jul. 29, 2019 and Japanese Patent Application No. 2020-116149 filed on Jul. 6, 2020. Each of the above applications is hereby expressly incorporated by reference, in its entirety, into the present application.

BACKGROUND OF THE INVENTION

Technical Field

The present invention relates to alloy nanoparticle, an aggregate of alloy nanoparticles, a catalyst, and a method for producing alloy nanoparticles.

Description of the Related Art

High-entropic alloys are materials having a history of about 20 years after proposed, and have been utilized in various structural metal materials such as steel materials and aluminum alloys. The origin of the name of a high-entropy alloy is that the sum of thermodynamic entropy at the time of alloying by mixing a plurality of elements shows a high value as compared with a conventional solid solution reinforced alloy.

A high-entropy alloy is expected as a material exhibiting excellent mechanical properties and functionality, but its development is essentially carried out mainly on a 3d alloy (PTL 1).

PTL 2 discloses multicomponent solid solution alloy nanoparticles in which a third element M (M=at least one of Rh, Ir, Au, Ag, and Pt) is added to PdRu and a method for producing the multicomponent solid solution alloy nanoparticles, but does not describe a high-entropy alloy, though Examples therein merely disclose quaternary solid solution nanoparticles.

NPL 1 discloses a method for producing high-entropy alloy nanoparticles in which a metal salt is supported on a carbon material and a large current is applied thereto so as to rapidly heat it at a high temperature of 2000 K or more and then to rapidly cool it.

PTL 3 discloses a carbon monoxide-resistant catalyst material containing a carrier material in which a binary alloy represented by PtX [X is rhodium or osmium] and a PtX alloy are dispersed, but there is no description of a ternary or higher alloy, and the alloy is produced by an impregnation method and is not a solid solution.

PTL 4 discloses a method for producing a catalyst that contains a ruthenium-containing catalyst layer formed on the surface of a structure, in which the ruthenium (Ru) precursor-containing solution for use for producing the catalyst layer can contain platinum (Pt), palladium (Pd), rhodium (Rh), iridium (Ir), osmium (Os) or a mixed metal precursor thereof, but in Examples therein, a catalyst layer containing any other noble metal than ruthenium is not produced.

PTL 5 discloses a platinum-containing catalyst PtX, in which it is said that X is at least one metal selected from the group consisting of a noble metal, ruthenium, rhodium, palladium, iridium, osmium, gold, silver and transition metals, but Examples therein merely disclose examples of X being Ru, and ternary or more multicomponent alloy catalysts are not produced therein.

PTL 6 discloses a catalyst for hydrogen purification that contains (a) at least one of ruthenium, rhodium and iridium, (b) platinum, and (c) osmium, and in Examples therein, ternary or quaternary catalysts of Pt—Ru—Os, Pt—Rh—Os, and Pt—Ru—Os—Ir are produced, but there is no description of quinary or higher multicomponent alloy catalysts, and there is no disclosure of a solid solution.

NPL 2 describes a production method for forming high-entropy alloy nanoparticles on a graphene carrier by mechanically powdering a graphene carrier and a metal. The elementary composition of FeCrCoCuNi nanoparticles shown in FIG. 9 does not indicate uniform mixing.

NPL 3 describes a production method for obtaining nanoparticles by applying a laser to a high-entropy alloy target of a bulk of a 3d transition metal (4th period). Table 2 therein shows a composition of CoCrFeMnNi nanoparticles but does not indicate uniformity of mixing.

NPL 4 describes a production method for obtaining nanoparticles by solvothermal analysis at around 200° C. using an organic metal salt of a platinum group element. FIG. 5 shows scanning transmission electron microscope (STEM)-energy dispersive X-ray analysis (EDS, also referred to as EDX) images of PtRhRu and PtPdIrRhRu particles, but from these images, uniformity in mixing at an atomic level could not be read.

CITATION LIST

Patent Literature

PTL 1: Republished JP 2017/098848A
PTL 2: WO2017/150596
PTL 3: JP 2016-511920A
PTL 4: JP 2017-13040A
PTL 5: JP 2010-534130A
PTL 6: JP 2003-146617A

Non-Patent Literature

NPL 1: Science (2018) 359, 1489-1494
NPL 2: SCIENTIFIC REPORTS (2018) 8:8737
NPL 3: RSC Adv. (2019) 9, 18547-18558
NPL 4: Adv. Funct. Mater. (2019) 1905933

SUMMARY OF THE INVENTION

Technical Problem to be Solved by Invention

The advantageous effects of the invention described in PTL 2 are that "by adding an additional element to a PdRu solid solution alloy that could not be obtained in a bulk, the solid solution state of Pd and Ru is stabilized and catalytic degradation under high-temperature conditions or long-term reaction is prevented" (see [0028]). Namely, the technical problem to be solved by PTL 2 is to increase the catalyst efficiency of PdRu. It is difficult to reach an idea of obtaining quinary or higher multicomponent alloy nanoparticles from the disclosure of Examples of quaternary solid solution nanoparticles in PTL 2 since the technical problems differs in that it is not clear as to whether or not the catalyst efficiency of PdRu could be increased in the case of increasing the number of elements to constitute a solid solution.

In NPL 1, a metal salt is reacted by pulse voltage application, and therefore a conductive carbon nanofiber carrier is indispensable, and in NPL 2, a graphene carrier is indispensable, and in these, only alloy nanoparticles supported on such a carrier could be obtained. In addition, in NPL 2, the method is mechanical milling, and therefore the particle diameter therein is nonuniform and uniform particles having a particle diameter of a few nm could not be obtained.

In the lower left portion of page 6 of NPL 4, the obtained nanoparticles are described as stable up to 700 K (427° C.). In particular, there appears an XRD pattern corresponding to hcp from 800 K, and this suggests formation of an Ru-rich phase of hcp. On the other hand, the literature says that there is little change in each peak position of fcc. If a uniform alloy is first formed and mainly Ru is precipitated, as in Table S1, Ru has a smaller atomic radius than others, so that its lattice constant expands according to the Vegard's law. FIG. S16 shows a relationship between the melting point and the crystallite size, and Ru is said to be a monometal and 2 nm or less. From these, NPL 4 says that a large crystallite fcc alloy and Ru-rich small particles are first precipitated nonuniformly, but because of the small crystal size, XRD indicates that a uniform fcc alloy is formed. When nanoparticles are heated, small hcp particles are roughened and give a remarkable peak in XRD, but it is considered that, since fcc does not change the peak position, and the metal composition ratio thereof does not almost change (Ru does not precipitate from the alloy but exists as different particles). Namely, for the nanoparticles obtained in NPL 4, mixing is not uniform, and therefore the nanoparticles could not be said to be alloy nanoparticles that contain five or more types of elements mixed at the atomic level.

In the case of batch-type solvothermal synthesis, airtightly sealed vials are gradually heated, and therefore in that case, metals that are more readily decomposed and reduced can react gradually and sequentially in order and a uniform alloy could hardly be formed since the reduction rate differs between the metals.

An object of (or a problem to be solved by) the present invention is to provide novel alloy nanoparticles containing five or more types of elements, which can be supported on a carrier other than a carbon fiber carrier and a graphene carrier.

Solution to Problem

The constitution of the present invention that is a specific means for solving the above-mentioned problem, and preferred embodiments of the present invention are described below.

[1] An alloy nanoparticle, wherein:
  the alloy nanoparticle contains five or more types of elements,
  in the case where the alloy nanoparticle is directly supported on a carbon material carrier, the carbon material carrier excludes graphene or carbon fibers.

[2] The alloy nanoparticle according to [1], wherein the elements constituting the alloy nanoparticle includes a combination of elements not dissolving in a phase equilibrium diagram in solid solution.

[3] The alloy nanoparticle according to [1] or [2], wherein the elements constituting the alloy nanoparticle contain at least five types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, H, B, Al, C, Si, N, P, Y, Zr, Nb, lanthanoids, Hf and Ta.

[4] The alloy nanoparticle according to any one of [1] to [3], wherein the elements constituting the alloy nanoparticle contains at least one type of elements of the group consisting of Ru, Rh, Pd, Os, Ir, Pt, Ag, Au, Cu, and Ni.

[5] The alloy nanoparticle according to any one of [1] to [4], wherein the elements constituting the alloy nanoparticle contains five or more types of platinum group elements.

[6] The alloy nanoparticle according to any one of [1] to [5], wherein the proportion of the platinum group elements inside the alloy nanoparticle is 5 atomic % or more.

[7] The alloy nanoparticle according to any one of [1] to [6], wherein the alloy nanoparticle is represented by the following formula (1):

$$Ru_pRh_qPd_rOs_xIr_yPt_z \quad (1)$$

wherein $p+q+r+x+y+z=1$; $0<p, q, r, x, y, z<1$; any one of p, q, r, x, y, and z is 0, or p, q, r, x, y, and z are all numbers between 0 and 1.

[8] The alloy nanoparticle according to any one of [1] to [7], wherein the average particle diameter of the alloy nanoparticles is 0.5 to 30 nm.

[9] The alloy nanoparticle according to any one of [1] to [8], in the form of an aggregate of the alloy nanoparticles.

[10] The alloy nanoparticle according to any one of [1] to [8], wherein the alloy nanoparticle is supported on a non-carbon material carrier or a granular carbon carrier.

[11] An aggregate of alloy nanoparticles, containing 98% by number or more of the alloy nanoparticles of any one of [1] to [8].

[12] A catalyst containing the alloy nanoparticles of any one of [1] to [10], or the aggregate of alloy nanoparticles of [11].

[13] The catalyst according to [12], wherein the arbitrary alloy nanoparticles contained in the catalyst contain all the five or more types of elements as the constituent elements.

[14] A production method for alloy nanoparticles for obtaining alloy nanoparticles containing five or more types of elements, comprising adding an aqueous solution containing salts of five or more types of elements to a liquid reducing agent heated up to 200° C. to 300° C. and reacting them, wherein:
  in the case where the alloy nanoparticles are directly supported on a carbon material carrier, the carbon material carrier excludes graphene or carbon fibers.

Preferred embodiments of the present invention include the following constitutions.

Item 1:
A platinum group multicomponent solid solution or the alloy nanoparticle according to any one of [1] to [10], containing five or more types of platinum group elements.

Item 2:
The platinum group multicomponent solid solution according to Item 1 or the alloy nanoparticle of any one of [1] to [10], wherein the platinum group multicomponent solid solution is in the form of nanoparticles having an average particle diameter of 0.5 nm to 0.5 m.

Item 3:
The platinum group multicomponent solid solution according to Item 1 or the alloy nanoparticle of any one of

[1] to [10], wherein the content of the platinum group elements is 5 atomic % or more.

Item 4:
The platinum group multicomponent solid solution according to any one of Items 1 to 3 or the alloy nanoparticle of any one of [1] to [10], covered with a protective agent.

Item 5:
The platinum group multicomponent solid solution according to any one of Items 1 to 4 or the alloy nanoparticle of any one of [1] to [10], supported on a carrier.

Item 6:
The platinum group multicomponent solid solution according to any one of Items 1 to 5 or the alloy nanoparticle of any one of [1] to [10], wherein the platinum group multicomponent solid solution is represented by the following formula (1):

$$Ru_p Rh_q Pd_r Os_x Ir_y Pt_z \qquad (1)$$

wherein p+q+r+x+y+z=1; 0<p, q, r, x, y, z<1; any one of p, q, r, x, y, and z is 0, or p, q, r, x, y, and z are all numbers between 0 and 1.

Item 7:
The platinum group multicomponent solid solution according to Item 6, wherein x is a number between 0 and 1.

Item 8:
The platinum group multicomponent solid solution according to any one of Items 1 to 7 or the alloy nanoparticle of any one of [1] to [10], wherein the crystal structure is fcc or hcp.

Item 9:
A catalyst containing the platinum group multicomponent solid solution according to any one of Items 1 to 8 or the alloy nanoparticle of any one of [1] to [10], as a constituent element.

Item 10:
A supported catalyst, containing the solid solution according to Item 5 or the alloy nanoparticle of any one of [1] to [10].

Item 11:
The catalyst according to Item 10, wherein the catalyst is a hydrogenation reaction catalyst, a hydrogen oxidation reaction catalyst, an oxygen reduction reaction (ORR) catalyst, an oxygen evolution reaction (OER) catalyst, a nitrogen oxide (NOx) reduction reaction catalyst, a carbon monoxide (CO) oxidation reaction catalyst, a dehydrogenation reaction catalyst, a VVOC or VOC oxidation reaction catalyst, an exhaust gas purification catalyst, a water electrolysis reaction catalyst, or a hydrogen fuel cell catalyst.

Item 12:
A production method for a platinum group multicomponent solid solution for obtaining a platinum group multicomponent solid solution containing five or more types of platinum group elements, including a step of adding an aqueous solution containing five types or six types of the group consisting of an Ru salt, an Rh salt, a Pd salt, an Os salt, an Ir salt and a Pt salt to a liquid reducing agent heated up to 200° C. to 300° C. and reacting them.

Item 13:
A production method for a supported catalyst for obtaining a catalyst of a platinum group multicomponent solid solution containing five or more types of platinum group elements supported on a carrier, including a step of adding an aqueous solution containing five types or six types of the group consisting of an Ru salt, an Rh salt, a Pd salt, an Os salt, an Ir salt and a Pt salt, and a carrier to a liquid reducing agent heated up to 200° C. to 300° C., and reacting them.

Advantageous Effects of Invention

According to the present invention, there can be provided a novel alloy nanoparticle containing five or more types of elements that can be supported on a carrier except a carbon fiber carrier and a graphene carrier.

BRIEF DESCRIPTION OF THE DRAWINGS

FIG. 7(*b*) is a graph relating to a comparison between a commercial catalyst and the alloy nanoparticles obtained in Example 1 relative to the current density therebetween in initial measurement of an ethanol oxidation electrode catalyst activity.

FIG. 7(*c*) is a graph relating to a comparison in the current density between at a voltage of 0.45 V (left side) and 0.60 V (right side) in initial measurement of an ethanol oxidation electrode catalyst activity with the alloy nanoparticles obtained in Example 1. FIG. 7(*d*) is a graph relating to a comparison in the current density between Au@PtIr/C and the alloy nanoparticles obtained in Example 1 in initial measurement of an ethanol oxidation electrode catalyst activity.

FIG. 7(*e*) is a graph relating to a comparison in the current density between the initial measurement and the 50th measurement of an ethanol oxidation electrode catalyst activity with the alloy nanoparticles obtained in Example 1.

FIG. 9(*b*) is a graph relating to a comparison in the current density per unit area (mA·cm$^{-2}$) of the electrode in measurement of a hydrogen generation electrode catalyst activity using an aqueous H$_2$SO$_4$ solution of the alloy nanoparticles obtained in Example 3.

FIG. 9(c) is a graph relating to a comparison in the current density in measurement of a hydrogen generation electrode catalyst activity using an aqueous KOH solution of the alloy nanoparticles obtained in Example 3. FIG. 9(d) is a graph relating to a comparison in the current density per unit area of the electrode in measurement of a hydrogen generation electrode catalyst activity using an aqueous KOH solution of the alloy nanoparticles obtained in Example 3.

DESCRIPTION OF THE PREFERRED EMBODIMENTS

Figure 1:
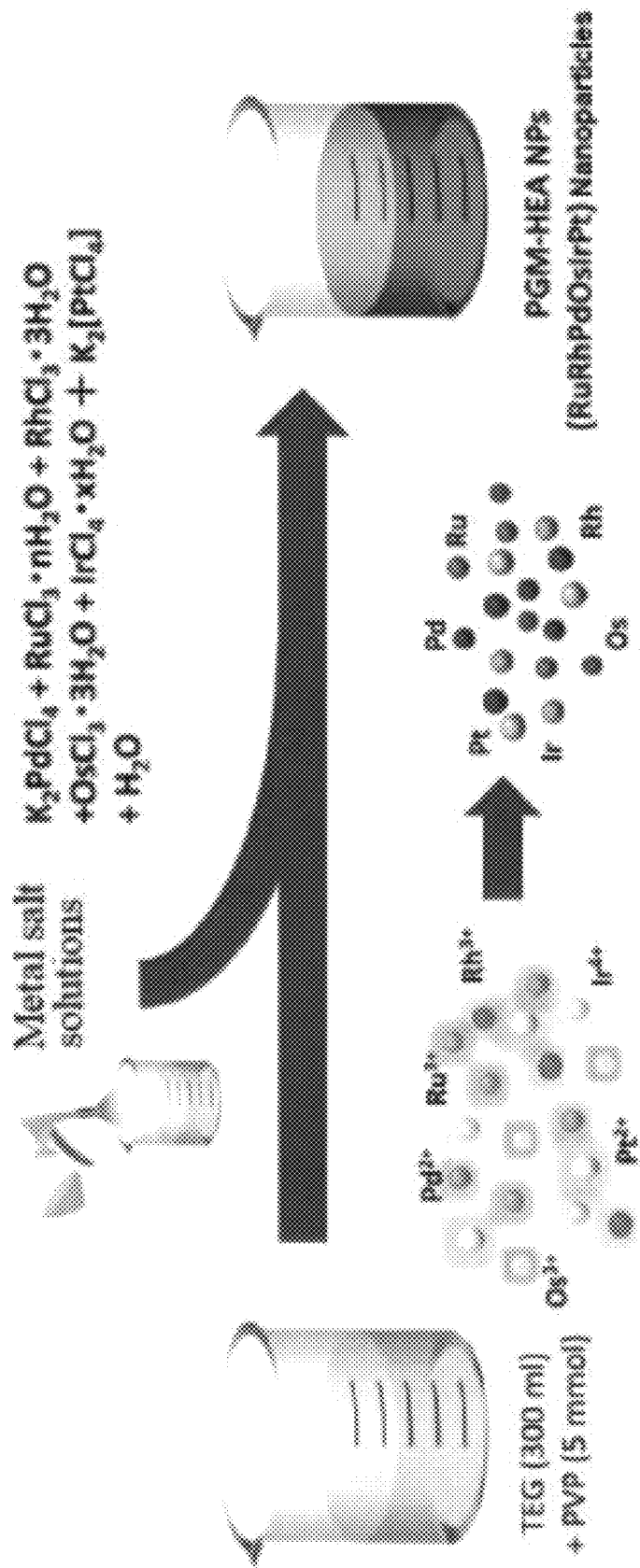
FIG. 1 This shows a production method for platinum group senary solid solution nanoparticles of alloy nanoparticles of Example 1.

In the following, the present invention is described in detail. The constitutional elements may be described below with reference to representative embodiments and specific examples of the invention, but the invention is not limited to the embodiments and the examples. In the description herein, a numerical range expressed as "to" means a range that falls between the former number indicating the lower limit of the range and the latter number indicating the upper limit thereof.

[Alloy Nanoparticle]

The alloy nanoparticle of the present invention is an alloy nanoparticle containing five or more types of elements. However, in the case where the alloy nanoparticle is directly supported on a carbon material carrier, the carbon material carrier excludes graphene or carbon fibers.

Having the constitution, there can be provided a novel alloy nanoparticle containing five or more types of elements, which can be supported on a carrier other than a carbon material carrier and a graphene carrier.

In the present specification, an alloy nanoparticle means an alloy nanoparticle having an average particle diameter of 0.5 nm to 0.5 m.

Preferably, the alloy nanoparticle has a high substance uniformity, and more preferably can show a stable structure when heated to have a high substance uniformity. In particular, a quinary or higher multicomponent high-entropy alloy has a large configurational entropy S, and therefore has a solid solution phase that is uniform and stable at high temperatures based on the Gibbs free energy G=H−TS (where H is an enthalpy, T is an absolute temperature, and S is an entropy). Especially preferably, the alloy nanoparticle shows a stable structure and has a high substance uniformity when heated, for example, up to 500 K or higher (preferably 700 K or higher, more preferably 900 K or higher). Substance uniformity can be confirmed by in-situ XRD or STEM-EDS.

Also preferably, in the alloy nanoparticle, the constituent elements are mixed at an atomic level. Specifically, in the case where alloy nanoparticles are used as an aggregate thereof, preferably, the aggregate of alloy nanoparticles contains the alloy nanoparticles of the present invention in an amount of 98% by number or more. Or also preferably, arbitrary alloy nanoparticles constituting an aggregate of alloy nanoparticles contain all five or more types of elements as the constituent elements. In the case where the alloy nanoparticle is used as a catalyst containing a large number of alloy nanoparticles, preferably, 98% by number or more of alloy nanoparticles contained in the catalyst are the alloy nanoparticles of the present invention. Or also preferably, arbitrary (any, freely selected, or predetermined) alloy nanoparticles contained in the catalyst contain all five or more types of elements as the constituent elements.

The alloy nanoparticle of the present invention is preferably a novel high-entropy alloy nanoparticle.

Preferred embodiments of the present invention are described hereinunder.

<Element>

The alloy nanoparticle of the present invention is composed of five or more types of elements, preferably 5 to 50 types of elements, more preferably 5 to 25 types of elements, even more preferably 5 to 10 types of elements, especially preferably 5 or 6 types of elements.

The types of the elements constituting the alloy nanoparticle of the present invention are not specifically limited, but preferably, the alloy nanoparticle is not a combination of elements to give an insulator (including an insulator oxide).

The elements constituting the alloy nanoparticle can contain a combination of elements not dissolving in solid solution in a phase equilibrium diagram, or may not contain a combination of elements not dissolving in solid solution in a phase equilibrium diagram. Specifically, the alloy nanoparticle may be a combination of elements that could not readily form a solid solution, or may also be a combination of elements that can readily form a solid solution. The phase equilibrium diagram is also referred to as a phase diagram, a state diagram or an alloy state diagram, and all similar diagrams can be used herein as a phase equilibrium diagram. The phase equilibrium diagram may be a phase equilibrium diagram of two elements, or may also be a phase equilibrium diagram of three or more elements.

According to the present invention, there can be provided a novel alloy nanoparticle containing five or more types of elements, in which a large variety of elements are mixed at an atomic level. Consequently, it is preferable that the elements constituting the alloy nanoparticle contain a combination of elements not dissolving in solid solution in a phase equilibrium diagram.

The combination of elements not dissolving in solid solution in a phase equilibrium diagram means a combination of elements having 30 atomic % or more immiscible region under a pressure of 1 atm (normal pressure) at 1000° C.

More preferably, the elements constituting the alloy contain a combination of elements not dissolving in solid solution in a binary phase equilibrium diagram or in a ternary phase equilibrium diagram, even more preferably contain a combination of elements not dissolving in solid solution both in a binary phase equilibrium diagram and in a ternary phase equilibrium diagram.

Among the combinations of two types of elements constituting the alloy, preferably at least one combination contains elements not dissolving in solid solution in a binary phase equilibrium diagram, more preferably two or more combinations contain elements not dissolving in solid solution in a binary phase equilibrium diagram.

Among the combinations of two types of elements constituting the alloy nanoparticle, at least one combination of elements not dissolving in solid solution in a binary phase equilibrium diagram includes PdRu, AuIr, AgRh, AuRh, AuRu, CuRu, CuIr, AgCu, FeCu, AgIr, AgRu, MoRu, RhC, RuN, RuSn, PdOs, CuOs, AgOs, AuOs, CuRh, IrRh, IrPd, AgPt, AuPt, and other combinations of a noble metal and any other metal than noble metals. Among five or more types of elements constituting the alloy nanoparticle, a combination of two types of elements not dissolving in solid solution in a binary phase equilibrium diagram includes a combination of PdRuRhOsIr and Pt, a combination of RuRhPdIr and Pt, and AuRuRhIrPt.

Among the combinations of three types of elements constituting the alloy nanoparticle, at least one combination of elements not dissolving in solid solution in a ternary phase equilibrium diagram includes PdRuB, AuRuIr, RuRhAu, PtIrRu, FeRuRh, AuIrRh, and AgIrRh.

Combinations of elements of which the binary phase equilibrium diagram is not known are also included in the combinations of elements not dissolving in solid solution in a phase equilibrium diagram so far as the combinations can have 30 atomic % or more immiscible region under a pressure of 1 atm (normal pressure) at 1000° C.

Preferably, the elements constituting the alloy nanoparticle include oxidation-resistant metals. Oxidation-resistant metals mean those capable of maintaining a metal state as particles having a particle diameter of 50 nm or less such as noble metals and Ni (those in which a metal structure such as fcc, bcc and hcp can be confirmed).

The alloy nanoparticle of the present invention preferably contains at least five types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, H, B, Al, C, Si, N, P, Y, Zr, Nb, lanthanoids, Hf and Ta.

More preferably, the elements constituting the alloy nanoparticle of the present invention contain at least five types of elements of the group consisting of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, B, Al, C, Si, N, P, and lanthanoids.

Among these, especially preferably, the elements constituting the alloy nanoparticle contain at least five types of elements of the group consisting of platinum group elements (Ru, Rh, Pd, Os, Ir, Pt), Ag, Au, In, Tl, Sn, Bi, Mo, W, Re, 3d metals (Sc, Ti, V, Cr, Mn, Fe, Co, Ni, Cu, Zn), Ga, B, C, N, and lanthanoids.

Even more preferably, the elements constituting the alloy nanoparticle contain five types of elements of the group consisting of Ru, Rh, Pd, Os, Ir, Pt, Ag, Au, Cu, and Ni.

Further more preferably, the elements constituting the alloy nanoparticle contain at least five types of elements of the group consisting of platinum group elements (Ru, Rh, Pd, Os, Ir, Pt).

Apart from the alloy nanoparticle composed of platinum group elements, another more preferred embodiment is an embodiment where the elements constituting the alloy nanoparticle contain at least five types of elements of the group consisting of Rh, Ru, Os, Ir, Pt, Au, Ag, Mo, W, Re, Fe, Co, Ni, Cu, C, N, and B, and even more preferred is an embodiment containing at least five types of elements of the group consisting of Rh, Pd, Os, Ir, Pt, Au, Ag, Mo, W, Re, Fe, Co, Ni, Cu, C, N, and B.

On the other hand, the elements constituting the alloy nanoparticle preferably contain at least one type of an element of the group consisting of platinum group elements (Ru, Rh, Pd, Os, Ir, Pt), Ag, Au, and Ni, and more preferably contain two types of the elements. Also especially preferably, the elements contain at least one type of an element of the group consisting of platinum group elements (Ru, Rh, Pd, Os, Ir, Pt), and even more preferably the elements contain two types of the elements.

The proportion of the platinum group elements in the case where the alloy nanoparticle of the present invention is a platinum group multicomponent solid solution is preferably 5 atomic % or more, 10 atomic % or more, 15 atomic % or more, 20 atomic % or more, 25 atomic % or more, 30 atomic % or more, 35 atomic % or more, 40 atomic % or more, 45 atomic % or more, 50 atomic % or more, 55 atomic % or more, 60 atomic % or more, 65 atomic % or more, 70 atomic % or more, 75 atomic % or more, 80 atomic % or more, 85 atomic % or more, 90 atomic % or more, 95 atomic % or more, 98 atomic % or more, or 100 atomic %.

According to one preferred embodiment of the present invention, there can be obtained a stable, platinum group elements-containing high-entropy solid solution (PGM-HEA). One preferred embodiment of the alloy nanoparticle of the present invention has five types or six types of platinum group elements, and can control the adsorption energy to a catalyst substrate in a broad energy range, and can provide a most suitable surface for the target reaction, that is, the alloy nanoparticle of the type is expected to have properties heretofore unknown in the related art. In addition, it enables use of Os heretofore difficult to use.

A platinum group multicomponent solid solution of one preferred embodiment of the alloy nanoparticle of the present invention is represented by the following formula (1):

$$Ru_p Rh_q Pd_r Os_x Ir_y Pt_z \qquad (1)$$

wherein $p+q+r+x+y+z=1$; $0<p, q, r, x, y, z<1$; any one of p, q, r, x, y, and z is 0, or p, q, r, x, y, and z are all numbers between 0 and 1.

Specifically, preferred embodiments of the present invention containing five types of platinum group elements include the following six cases.

(i) $p=0$, $0<q$, $r$, $x$, $y$, $z<1$, preferably $0.03 \le q \le 0.5$, $0.03 \le r \le 0.5$, $0.03 \le x \le 0.5$, $0.03 \le y \le 0.5$, $0.03 \le z \le 0.5$, more preferably $0.05 \le q \le 0.4$, $0.05 \le r \le 0.4$, $0.05 \le x \le 0.4$, $0.05 \le y \le 0.4$, $0.05 \le z \le 0.4$, even more preferably $0.1 \le q \le 0.3$, $0.1 \le r \le 0.3$, $0.1 \le x \le 0.3$, $0.1 \le y \le 0.3$, $0.1 \le z \le 0.3$;

(ii) $q=0$, $0<p$, $r$, $x$, $y$, $z<1$, preferably $0.03 \le p \le 0.5$, $0.03 \le r \le 0.5$, $0.03 \le x \le 0.5$, $0.03 \le y \le 0.5$, $0.03 \le z \le 0.5$, more preferably $0.05 \le p \le 0.4$, $0.05 \le r \le 0.4$, $0.05 \le x \le 0.4$, $0.05 \le y \le 0.4$, $0.05 \le z \le 0.4$, even more preferably $0.1 \le p \le 0.3$, $0.1 \le r \le 0.3$, $0.1 \le x \le 0.3$, $0.1 \le y \le 0.3$, $0.1 \le z \le 0.3$;

(iii) $r=0$, $0<p$, $q$, $x$, $y$, $z<1$, preferably $0.03 \le p \le 0.5$, $0.03 \le q \le 0.5$, $0.03 \le x \le 0.5$, $0.03 \le y \le 0.5$, $0.03 \le z \le 0.5$, more preferably $0.05 \le p \le 0.4$, $0.05 \le q \le 0.4$, $0.05 \le x \le 0.4$, $0.05 \le y \le 0.4$, $0.05 \le z \le 0.4$, even more preferably $0.1 \le p \le 0.3$, $0.1 \le q \le 0.3$, $0.1 \le x \le 0.3$, $0.1 \le y \le 0.3$, $0.1 \le z \le 0.3$;

(iv) $x=0$, $0<p$, $q$, $r$, $y$, $z<1$, preferably $0.03 \le p \le 0.5$, $0.03 \le q \le 0.5$, $0.03 \le r \le 0.5$, $0.03 \le y \le 0.5$, $0.03 \le z \le 0.5$, more preferably $0.05 \le p \le 0.4$, $0.05 \le q \le 0.4$, $0.05 \le r \le 0.4$, $0.05 \le y \le 0.4$, $0.05 \le z \le 0.4$, even more preferably $0.1 \le p \le 0.3$, $0.1 \le q \le 0.3$, $0.1 \le r \le 0.3$, $0.1 \le y \le 0.3$, $0.1 \le z \le 0.3$;

(v) $y=0$, $0<p$, $q$, $r$, $x$, $z<1$, preferably $0.03 \le p \le 0.5$, $0.03 \le q \le 0.5$, $0.03 \le r \le 0.5$, $0.03 \le x \le 0.5$, $0.03 \le z \le 0.5$, more preferably $0.05 \le p \le 0.4$, $0.05 \le q \le 0.4$, $0.05 \le r \le 0.4$, $0.05 \le x \le 0.4$, $0.05 \le z \le 0.4$, even more preferably $0.1 \le p \le 0.3$, $0.1 \le q \le 0.3$, $0.1 \le r \le 0.3$, $0.1 \le x \le 0.3$, $0.1 \le z \le 0.3$;

(vi) $z=0$, $0<p$, $q$, $r$, $x$, $y<1$, preferably $0.03 \le p \le 0.5$, $0.03 \le q \le 0.5$, $0.03 \le r \le 0.5$, $0.03 \le x \le 0.5$, $0.03 \le y \le 0.5$, more preferably $0.05 \le p \le 0.4$, $0.05 \le q \le 0.4$, $0.05 \le r \le 0.4$, $0.05 \le x \le 0.4$, $0.05 \le y \le 0.4$, even more preferably $0.1 \le p \le 0.3$, $0.1 \le q \le 0.3$, $0.1 \le r \le 0.3$, $0.1 \le x \le 0.3$, $0.1 \le y \le 0.3$.

In the case containing six types of platinum group elements;

(vii) $0 < p, q, r, x, y, z < 1$, preferably $0.03 \le p \le 0.5$, $0.03 \le q \le 0.5$, $0.03 \le r \le 0.5$, $0.03 \le x \le 0.5$, $0.03 \le y \le 0.5$, $0.03 \le z \le 0.5$, more preferably $0.05 \le p \le 0.4$, $0.05 \le q \le 0.4$, $0.05 \le r \le 0.4$, $0.05 \le x \le 0.4$, $0.05 \le y \le 0.4$, $0.05 \le z \le 0.4$, even more preferably $0.1 \le p \le 0.3$, $0.1 \le q \le 0.3$, $0.1 \le r \le 0.3$, $0.1 \le x \le 0.3$, $0.1 \le y \le 0.3$, $0.1 \le z \le 0.3$.

The crystal structure of the alloy nanoparticle is not specifically limited. Depending on the composition of the alloy nanoparticle and the average electronic number of all the nanoparticles, the alloy nanoparticle may have a crystal structure such as a face-centered cubic lattice (fcc), a hexagonal close-packed lattice (hcp), or a body-centered cubic lattice (bcc). The alloy nanoparticle of one preferred embodiment of the present invention is a solid solution having an fcc structure or an hcp structure.

In the case where the alloy nanoparticle is a regular alloy (that is, in the case where the alloy nanoparticle has a regular phase), or where the alloy nanoparticle forms an amorphous structure or forms an intermetallic compound, the alloy nanoparticle can maintain the other structure than the above-mentioned structure. In the case where the alloy nanoparticle contains a mixture of elements greatly differing from each other in the atomic radius or the electric negativity, it may form an intermetallic compound. The intermetallic compound does not have a random atomic configuration but is a regular alloy. The case includes an embodiment where among the combinations of two types of elements constituting the alloy nanoparticle, at least one combination is a part of RhC, PdB or a combination of a noble metal and a transition metal, or an embodiment where at least one combination among them is a part of a combination of a noble metal and a typical element such as RuSn. In the case of a regular alloy containing a large number of constituent elements, the atomic site in the regular alloy may be randomly composed of specific plural elements. For example, at the atomic site of an element having a large atomic radius, elements having a large atomic radius can be randomly arranged, while at the atomic site of an element having a small atomic radius, elements having a small atomic radius can be randomly arranged.

Among six types of elements of a platinum group, fcc (face-centered cubic lattice) contains four types of Rh, Pd, Ir and Pt, and hcp (hexagonal close-packed lattice) contains two types of Os and Ru. The alloy nanoparticle of one preferred embodiment of the present invention is a solid solution of an fcc structure containing platinum group elements. The alloy nanoparticle of another preferred embodiment of the present invention is a solid solution of an hcp structure containing platinum group elements. In the case of using six types of platinum group elements, the proportion of the fcc structure can be high like in the original, or the proportion of the hcp structure can be high.

The solid solution uniformity of the alloy nanoparticle of the present invention is high, and therefore it is preferable that the five or more types of elements are uniformly distributed and dissolved in solid in the alloy nanoparticle. Here, "uniformly distributed" means that there is no bias in the distribution of the five or more types of elements, and preferably, no bias is confirmed in the distribution of elements (atoms) in the energy dispersion X-ray analysis maps. Also preferably, a single fcc or hcp pattern is confirmed in powdery X-ray diffractometry (XRD). Even though fcc and hcp coexist, it is considered that the constituent elements are uniformly distributed in each structure so far as the atomic distance is the same in the two structures. At that time, the metallic composition of the two structures fcc and hcp is the same, and therefore the atomic distance is also the same in the two.

(Proportion of Elements)

The alloy nanoparticle of the present invention is not specifically limited in respect of the proportion of each element constituting the alloy nanoparticle inside the alloy nanoparticle. Specifically, the average composition of the alloy nanoparticle of the present invention is not specifically limited.

In one preferred embodiment of the present invention, when the total amount of the alloy nanoparticle is set to 100 atomic %, the upper limit of the proportion of the element that accounts for the largest amount in the alloy nanoparticle is 80 atomic % or less, 70 atomic % or less, 60 atomic % or less, 50 atomic % or less, 45 atomic % or less, 40 atomic % or less, or 35 atomic % or less.

In one preferred embodiment of the present invention, when the total amount of the alloy nanoparticle is set to 100 atomic %, the lower limit of the proportion of the element that accounts for the smallest amount in the alloy nanoparticle is 1 atomic % or more, 5 atomic % or more, 9 atomic % or more, 10 atomic % or more, or 15 atomic % or more.

The amount of the element having a largest atomic ratio is preferably 1 to 500 times the element having a smallest atomic ratio, more preferably 1 to 5 times, even more preferably 1 to 3 times, especially more preferably 1 to 2 times, most preferably 1 to 1.5 times. In the case where the alloy nanoparticle of the present invention is a high-entropy solid solution alloy, preferably, the atomic ratio of the five or more types of elements therein is as close as possible, and especially preferably, the atomic ratio of the five or six types of platinum group elements therein is as close as possible.

In one preferred embodiment of the present invention, the alloy nanoparticle of the present invention contains Os. Among platinum group elements, Os is readily oxidized to often give a toxic oxide such as $OsO_4$, but when forming a solid solution alloy along with the other four types or five types of platinum group elements, Os can be prevented from being oxidized to give a toxic oxide such as $OsO_4$.

<Shape of Alloy Nanoparticle>

The shape of the alloy nanoparticle of the present invention includes various shapes such as a spherical shape, an elliptical shape, a rectangular cylindrical shape, a cylindrical shape, a cubic shape, a rectangular parallelepiped shape, and a scale-like shape, and is preferably a spherical shape or an elliptical shape.

The average particle diameter of the alloy nanoparticles is preferably 0.5 to 50 nm, more preferably 0.5 to 30 nm, even more preferably 1.0 to 20 nm. The average particle diameter of the particles can be calculated as an arithmetic average, for example, by direct observation with a transition electron microscope (TEM). The average particle diameter of the above-mentioned particles is an average particle diameter of the alloy nanoparticles, and in the case where the alloy nanoparticles are supported on a carrier, it is an average particle diameter of the alloy nanoparticles excluding the carrier.

The particle diameter distribution of the particles is preferably an average particle diameter ±0.1 to 15 nm, more preferably ±0.3 to 15 nm, even more preferably ±0.5 to 10 nm.

The alloy nanoparticle of the present invention may be in the form of an aggregate of alloy nanoparticles, or may also be in the form supported on a carrier.

(Aggregate of Alloy Nanoparticles)

The aggregate of alloy nanoparticles means a powder of a large number of alloy nanoparticles aggregated together.

For example, it is preferable that the aggregate of alloy nanoparticles does not substantially contain a carrier, or is not supported on a carrier.

The aggregate of alloy nanoparticles may contain a protective agent such as a polymer.

Also the aggregate of alloy nanoparticles may have an oxide coating film on the surface of each alloy nanoparticle.

The aggregate of alloy nanoparticles may contain impurity particles in addition to the alloy nanoparticles of the present invention. However, the aggregate of alloy nanoparticles preferably contains the alloy nanoparticles of the present invention in an amount of 90% by number or more, more preferably 98% by number or more, even more preferably 99% by number or more, and especially more preferably 100% by number.

The aggregate of alloy nanoparticles may contain, in addition to the alloy nanoparticles in which all the five or more types of elements contained in the compounds used in production of the alloy nanoparticles are dissolved in a solid solution, alloy nanoparticles in which only a part of the five or more types of elements contained in the compounds used in the production are dissolved in a solid solution. However, it is preferable that the proportion of the alloy nanoparticles of the same type of elements dissolved in a solid solution is high. Among the alloy nanoparticles constituting the aggregate of alloy nanoparticles, the aggregate preferably contains alloy nanoparticles containing all the five or more types of elements as the constituent elements in an amount of 90% by number or more, more preferably 98% by number or more, even more preferably 99% by number or more, and especially more preferably 100% by number.

The proportion of the particles contained in the aggregate of alloy nanoparticles can be determined within a range of the field of view vision in observing a part of the aggregate of alloy nanoparticles. For example, in a range of the field of view where a part of the aggregate of alloy nanoparticles is observed, it is desirable that, among the alloy nanoparticles constituting the aggregate of alloy nanoparticles, the aggregate contains alloy nanoparticles containing all the five or more types of elements as the constituent elements in the above range. However, it is more desirable that the proportion of the alloy nanoparticles contained in the aggregate of alloy nanoparticles is determined as an average value of the found data in a plurality of the fields of view where a part of the aggregate of alloy nanoparticles is observed.

(Carrier)

In the case where the alloy nanoparticles are directly supported on a carbon material carrier, the carbon material carrier excludes graphene or carbon fibers.

Specifically, the carrier to be used includes oxides, nitrides, carbides, elemental carbon (excluding graphene or carbon fibers), and elemental metals.

The oxides for use for the carrier include oxides such as silica, alumina, ceria, titania, zirconia, and niobia, and composite oxides such as silica-alumina, titania-zirconia, ceria-zirconia, and strontium titanate.

The elemental carbon includes active carbon, carbon black, graphite, and carbon nanotubes.

The nitrides include boron nitride, silicon nitride, gallium nitride, indium nitride, aluminum nitride, zirconium nitride, vanadium nitride, tungsten nitride, molybdenum nitride, titanium nitride, and niobium nitride.

The carbides include silicon carbide, gallium carbide, indium carbide, aluminum carbide, zirconium carbide, vanadium carbide, tungsten carbide, molybdenum carbide, titanium carbide, niobium carbide, and boron carbide.

The elemental metals include pure metals such as iron, copper and aluminum, and alloys such as stainless steel.

In the present invention where the alloy nanoparticles are directly supported on a carbon material carrier, the carbon material carrier excludes graphene or carbon fibers. Namely, the carrier is preferably a non-carbon fiber carrier (a material that is not a material of an elemental carbon) or a granular carbon carrier, more preferably a non-carbon material carrier since the carrier of the type is not burnt in a high-temperature oxidizing atmosphere, and is especially preferably an oxide carrier. As the granular carbon carrier, active carbon is usable.

<Protective Agent>

The alloy nanoparticle of the present invention can be covered with a protective agent (preferably a surface protective agent). The protective agent includes polymers such as polyvinyl pyrrolidone (PVP) and polyethylene glycol (PEG), amines such as oleylamine, and carboxylic acids such as oleic acid.

<Method for Producing Alloy Nanoparticle>

The production method for alloy nanoparticles of the present invention includes a step of adding an aqueous solution containing salts of five or more types of elements to a liquid reducing agent heated up to 200° C. to 300° C. and reacting them to obtain alloy nanoparticles containing five or more types of elements. However, in the case where the alloy nanoparticles are directly supported on a carbon material carrier, the carbon material carrier excludes graphene or carbon fibers.

The production method for alloy nanoparticles of the present invention is preferably a production method for a platinum group multicomponent solid solution for obtaining a platinum group multicomponent solid solution containing five or more types of platinum group elements, including a step of adding an aqueous solution containing five types or six types of the group consisting of an Ru salt, an Rh salt, a Pd salt, an Os salt, an Ir salt and a Pt salt to a liquid reducing agent heated up to 200° C. to 300° C. and reacting them.

Hereinunder, preferred embodiments of the production method for alloy nanoparticles are described.

(Preparation of Raw Material Solution)

The production method for alloy nanoparticles preferably includes a step of preparing a solution (raw material solution) of a compound containing each element to constitute the alloy nanoparticle.

Each element to constitute the alloy nanoparticle is dissolved in a solvent.

A polar solvent is usable, including water, alcohols (e.g., methanol, ethanol, isopropanol), polyols (e.g., ethylene glycol, diethylene glycol, triethylene glycol, propylene glycol, glycerin), polyethers (e.g., polyethylene glycol), acetonitrile, acetone, dimethylformamide, dimethyl sulfoxide, and N-methylpyrrolidone. Among these, water and alcohols are preferred.

A nonpolar solvent is also usable, including hexane, benzene, toluene, diethyl ether, chloroform, ethyl acetate and THF.

Preferably, the raw material solution is an aqueous solution containing a water-soluble salt of a metal element or a water-soluble salt of an element except metals, but in the case of a combination of nonpolar metal salts, a nonpolar solvent containing a nonpolar metal salt can be used.

By controlling the molar ratio of the compounds each containing the constituent element, the molar ratio of the elements constituting the alloy nanoparticle to be obtained can be controlled.

Salts of water soluble elements include the following:

Known water-soluble salts (e.g., sulfates, nitrates, acetates, chlorides, bromides, iodides, potassium cyanates, sodium cyanates, hydroxides, carbonates) of platinum group elements (Ru, Rh, Pd, Os, Ir, Pt), Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, B, Al, C, Si, N, P, Y, Zr, Nb, lanthanoids, Hf and Ta. The following are especially preferred.

Ru: Ruthenium halides such as $RuCl_3$, $RuCl_3 \cdot nH_2O$, $RuBr_3$ and $K_2RuCl_5(NO)$, and ruthenium nitrate, $Ru_3(CO)_{12}$, $Ru(NO)(NO_3)_a(OH)_b$, and $Ru(acac)_3$.

Rh: Rhodium acetate, rhodium nitrate, rhodium chloride ($RhCl_3$), and $RhCl_3 \cdot 3H_2O$.

Pd: $K_2PdCl_4$, $Na_2PdCl_4$, $K_2PdBr_4$, $Na_2PdBr_4$, and palladium nitrate.

Os: Osmium halides such as $OsCl_3$, and $OsBr_3$.

Ir: Iridium chloride, iridium acetylacetonate (acac; acac compounds are preferably dissolved in a nonpolar solvent), potassium iridium cyanate, potassium iridate, and $H_2IrCl_6$.

Pt: $K_2PtCl_4$, $(NH_4)_2K_2PtCl_4$, $(NH_4)_2PtCl_6$, $Na_2PtCl_6$, $H_2PtCl_6$ and $Pt(acac)_2$.

Au: $AuCl_3$, $HAuCl_4$, $K[AuCl_4]$, $Na[AuCl_4]$, $K[Au(CN)_2]$, $K[Au(CN)_4]$, $AuBr_3$, and $HAuBr_4$.

Ag: $AgNO_3$, and $Ag(CH_3COO)$.

In: $InCl_3 \cdot 4H_2O$.

Sn: $SnCl_3 \cdot 2H_2O$, and $Sn(ethyhex)_2$.

Mo: $Mo(CO)_6$.

Cu: $Cu(NO_3)_2$, $CuSO_4$, $Cu(CH_3COO)_2$, $CuCO_3$, $CuCl$, and $CuCl_2$.

Fe: $FeCl_3 \cdot 6H_2O$, $FeCl_2 \cdot 4H_2O$, and $Fe(NO_3)_3$.

Co: $CoCl_2 \cdot 6H_2O$.

Ni: $NiCl_2 \cdot 6H_2O$.

B: $BH_3$.

N: $Ru(NO)(NO_3)_a(OH)_b$, ammonia, nitric acid, and hydrazine.

(Ultrasonic Treatment)

The production method preferably includes a step of ultrasonic treatment for the solution (raw material solution) of a compound containing each element to constitute the alloy nanoparticle.

However, in place of the step of ultrasonic treatment for the raw material solution, also employable is a method, if any, capable of uniformly preparing the raw material solution and at the same speed as that in ultrasonic treatment.

(Preparation of Reducing Agent)

Also preferably, the production method for alloy nanoparticles includes a step of preparing a reducing agent.

The reducing agent is preferably a liquid reducing agent.

Examples of the liquid reducing agent include polyalcohols such as ethylene glycol, glycerin, diethylene glycol, and triethylene glycol; or lower alcohols such as methanol, ethanol, n-propanol, isopropanol, n-butanol or isobutanol under high pressure; or hydrous alcohols such as hydrous ethanol under high pressure; a THE solution of $BH_3$ (THF complex); or hydrazine, an $NaBH_4$ solution, and a sodium naphthalenide solution. Each element constituting the alloy nanoparticle can also be sued as a reducing agent. For example, a THE solution of $BH_3$ (THF complex) can be used as a reducing agent to produce alloy nanoparticles containing a B element.

In the case where the raw materials are mixed and heated under the pressure using the flow apparatus to be mentioned below, a reducing agent having a low boiling point can be used preferably. The boiling point of a lower alcohol which is a preferred reducing agent is room temperature to around 130° C., more preferably 40 to 120° C. or so, even more preferably 60 to 100° C. Since the boiling point of these reducing agent is low under normal pressure, it is difficult to produce alloy nanoparticles formed of metals not dissolving in solid solution in a phase equilibrium diagram by reducing compounds that contain elements constituting the alloy nanoparticles (e.g., metal compounds). At high temperatures under pressure, these reducing agent can exhibit reducing performance, and therefore under such conditions, these can function as a reducing agent for producing alloy nanoparticles composed of metals not dissolving in solid solution in a phase equilibrium diagram.

The reducing agent is used in an amount of 1 equivalent or more for reducing the compounds (preferably water-soluble salts) that contain elements constituting the alloy nanoparticles, and is preferably used in an excessive amount.

(Mixing)

The production method for alloy nanoparticles preferably includes a step of mixing the raw material solution to give a mixed solution.

Before or during heating the mixed solution, preferably a reducing agent is mixed in the raw material solutions.

The production method for alloy nanoparticles preferably includes a step of heating and reacting the mixed solution.

The heating time in heating can be 1 minute to 12 hours or so.

Preferably, the heating is carried out with stirring.

The reaction temperature in heating is preferably 170 to 300° C. or so, more preferably 180 to 250° C. or so. In the case where a reducing agent such as $NaBH_4$ is used, it can be used at room temperature or with cooling.

The mixing or heating method is not specifically limited, and for example, one or both of the reducing agent and the mixed solution can be previously heated and mixed.

Preferably, the production method for alloy nanoparticles includes a step of heating the reducing agent, and also preferably, a raw material solution is added to the reducing agent heated in this step, and further heated and reacted. For example, a reducing agent is previously heated, and a mixed solution may be dropwise added thereto via a pump (syringe pump) or may be sprayed thereon with a spraying device and then mixed.

Also a ultrasonically-treated raw material solution and a solution of a reducing agent may be put in a reactor, and then mixed and heated therein using a flow apparatus (flow reactor) for reaction under heat and pressure.

In the case of reaction under pressure in a flow apparatus, the pressure of the raw material solution and the solution of a reducing agent each are preferably 0.1 to 10 MPa or so, more preferably 0.2 to 10 MPa or so, even more preferably 0.2 to 9 MPa or so. The pressure inside the reactor is preferably 0.1 to 20 MPa or so, more preferably 0.2 to 10 MPa or so, even more preferably 0.2 to 9 MPa or so. The pressure inside the reactor is substantially equal to the back pressure of the back pressure valve provided downstream the reactor, and can be controlled by controlling the back pressure valve. The temperature in the reactor (reaction temperature) under pressure is 100 to 400° C. or so, preferably 150 to 300° C. or so, more preferably 180 to 240° C. or so.

(Collection of Alloy Nanoparticles)

The production method for alloy nanoparticles preferably includes a step of collecting a precipitate from the solution after reaction under heat.

The step gives alloy nanoparticles containing five or more types of elements in a state of a solid solution.

The means of collecting the precipitate includes reduced-pressure drying, centrifugal separation, filtration, precipitation, reprecipitation, and separation with a powdery separator (cyclone).

Before collecting the precipitate, preferably, the solution after reaction is left cooled or is rapidly cooled.

A protective agent may be added to the mixed solution, or a reducing agent, or a reaction solution prepared by mixing these to produce particles (preferably nanoparticles) prevented from being aggregated.

In the case of using a protective agent, the protective agent is contained in the reaction solution prepared by mixing a mixed solution of a raw material solution and a reducing agent, in an amount of preferably 0.01 to 100 times, as a ratio by mass, the total amount of the metal compounds in the reaction solution, more preferably 0.5 to 50 times, even more preferably 1 to 10 times. The protective agent can be contained in a raw material solution, or can be contained in a reducing agent, or can also be contained in both a raw material solution and a reducing agent.

A carrier may be mixed in the mixed solution, or a reducing agent, or a reaction solution prepared by mixing these, and in the case, a supported catalyst of alloy nanoparticles supported on the carrier can be obtained.

By mixing (co-existing) a carrier in the reaction solution, a supported catalyst of a multicomponent solid solution supported on the carrier can be obtained. In the case where the multicomponent solid solution is in the form of nanoparticles, a protective agent can be added simultaneously with a carrier to the reaction solution for producing multicomponent solid solution nanoparticles to obtain a supported catalyst in which the nanoparticles are prevented from aggregating.

On the other hand, a protective agent and a carrier may not be added to the mixed solution, the reducing agent or a reaction solution of a mixture of these. With that, alloy nanoparticles in the form of an aggregate of alloy nanoparticles can be obtained.

In that case, the alloy nanoparticles in the form of an aggregate of alloy nanoparticles and a carrier may be mixed in a solution or powders thereof may be mixed in a non-solvent system or a solvent system, and then shaped to give a supported catalyst of the alloy nanoparticles supported on a carrier. In the case where a solvent is used, if desired, the resultant product may be filtered and then dried.

[Catalyst]

The alloy nanoparticles of the present invention can be used as a catalyst that exhibits excellent performance. In use as a catalyst, the shape of the alloy nanoparticles is not specifically limited.

The alloy nanoparticles can also be used as a supported catalyst that is supported on a carrier.

The catalytic reaction in which the alloy nanoparticles of the present invention exhibits excellent performance as a catalyst is not specifically limited. For example, there is mentioned a reaction generally known as a reaction using a platinum group element-containing catalyst. Specifically, the reaction includes chemical reactions such as a reduction reaction including a hydrogenation reaction, a dehydrogenation reaction, an oxidation reaction including firing, and a coupling reaction. In addition, based on the catalytic performance, the catalyst can be favorably used in various processes and devices. For example, but not specifically limited thereto, preferred applications using the catalyst include a hydrogen emission reaction (HER) catalyst, a hydrogenation catalyst, a hydrogen oxidation reaction catalyst, an oxygen reducing reaction (ORR) catalyst, an oxygen emitting reaction (OER) catalyst, a nitrogen oxide (NOx) reducing reaction catalyst, a carbon monoxide (CO) oxidation reaction catalyst, a dehydrogenation reaction catalyst, a VVOC or VOC oxidation reaction catalyst, an exhaust gas purification catalyst, a water electrolysis reaction catalyst, and a hydrogen fuel cell catalyst.

EXAMPLES

Hereinunder the present invention is described more specifically with reference to Examples and Comparative Examples, in which the material used, its amount and ratio, the details of the treatment and the treatment process may be suitably modified or changed not overstepping the spirit and the scope of the invention. Accordingly, the invention should not be limitatively interpreted by the Examples mentioned below.

[Apparatus]

In Examples, the following apparatuses were used.
(i-1) Powder X-ray Diffraction (PXRD)
  Rigaku Miniflex 600 (Cu Kα)
(i-2) PXRD
  SPring-8 BL02B2 (measurement wavelength 0.62938 (6) angstroms)
(ii) Energy-dispersive x-ray spectroscopy in scanning transmission electron microscopy (STEM-EDS)
  JEOL JEM-ARM200CF (accelerating voltage: 120 kV)
(iii) X-ray fluorescence analysis (XRF)
  Fluorescent X-ray analyzer ZSX Primus IV

[Example 1] Production of Platinum Group Senary Solid Solution Nanoparticles

<Preparation of Alloy Nanoparticles>

300 ml of triethylene glycol (TEG) was stirred with heating at 230° C., and a metal ion mixed solution of an ion-exchanged water solution (40 ml) of $K_2PdCl_4$ (0.167 mmol), $RuCl_3·nH_2O$ (0.167 mmol), $RhCl_3·3H_2O$ (0.167 mmol), $OsCl_3·3H_2O$ (0.167 mmol), $IrCl_4·xH_2O$ (0.167 mmol) and $K_2[PtCl_4]$ (0.167 mmol) was added thereto by spraying, then kept 230° C. for 5 minutes, and left cooled, and the resultant precipitate was separated by centrifugation (FIG. 1).

Figure 2:
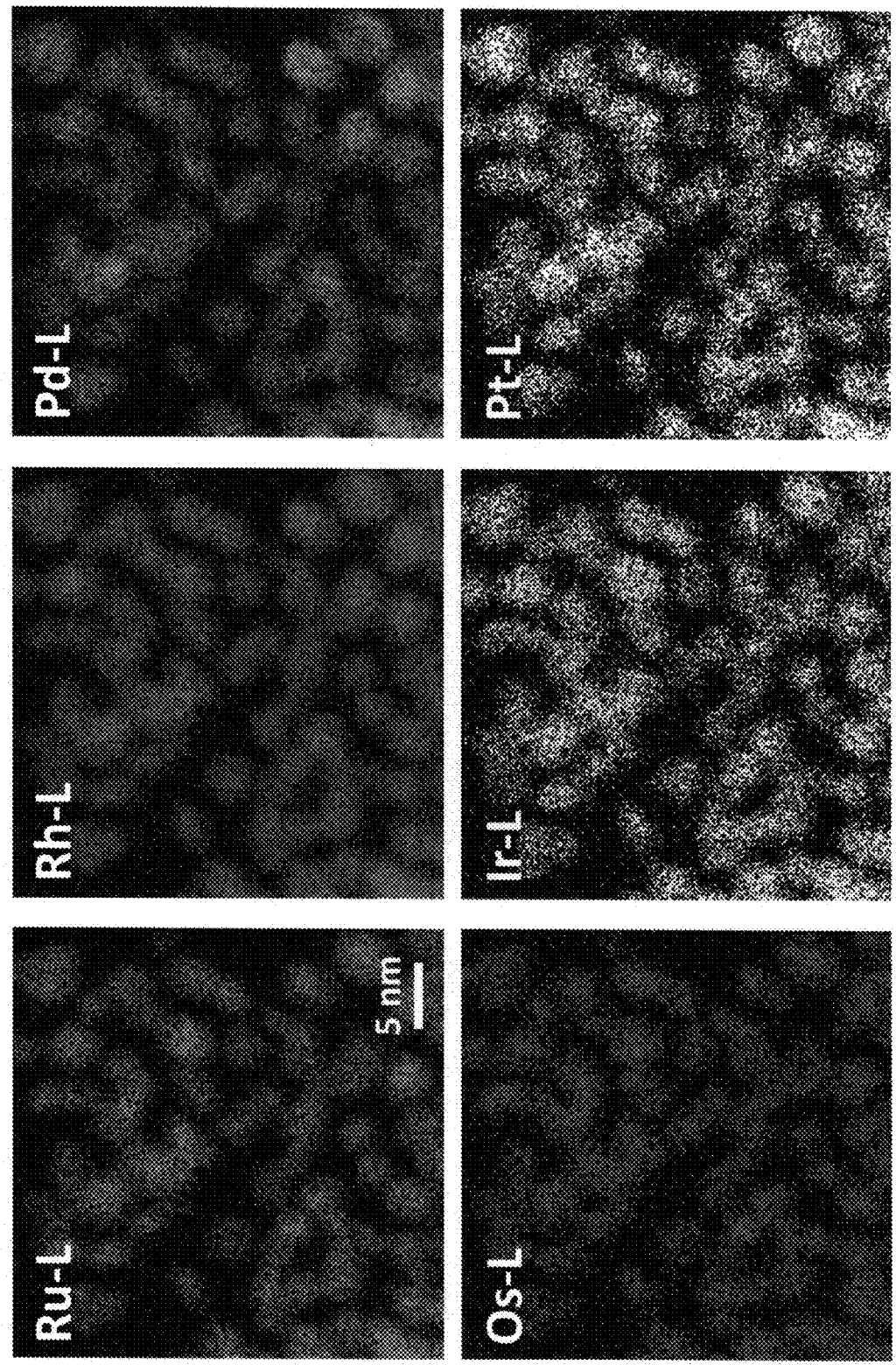
FIG. 2 This shows energy dispersion X-ray analysis (EDS) maps of platinum group senary solid solution nanoparticles obtained in Example 1, in which six types of platinum group elements (Ru, Rh, Pd, Os, Ir, Pt) are homogeneously distributed as nanoparticles to form a solid solution.
Figure 3:
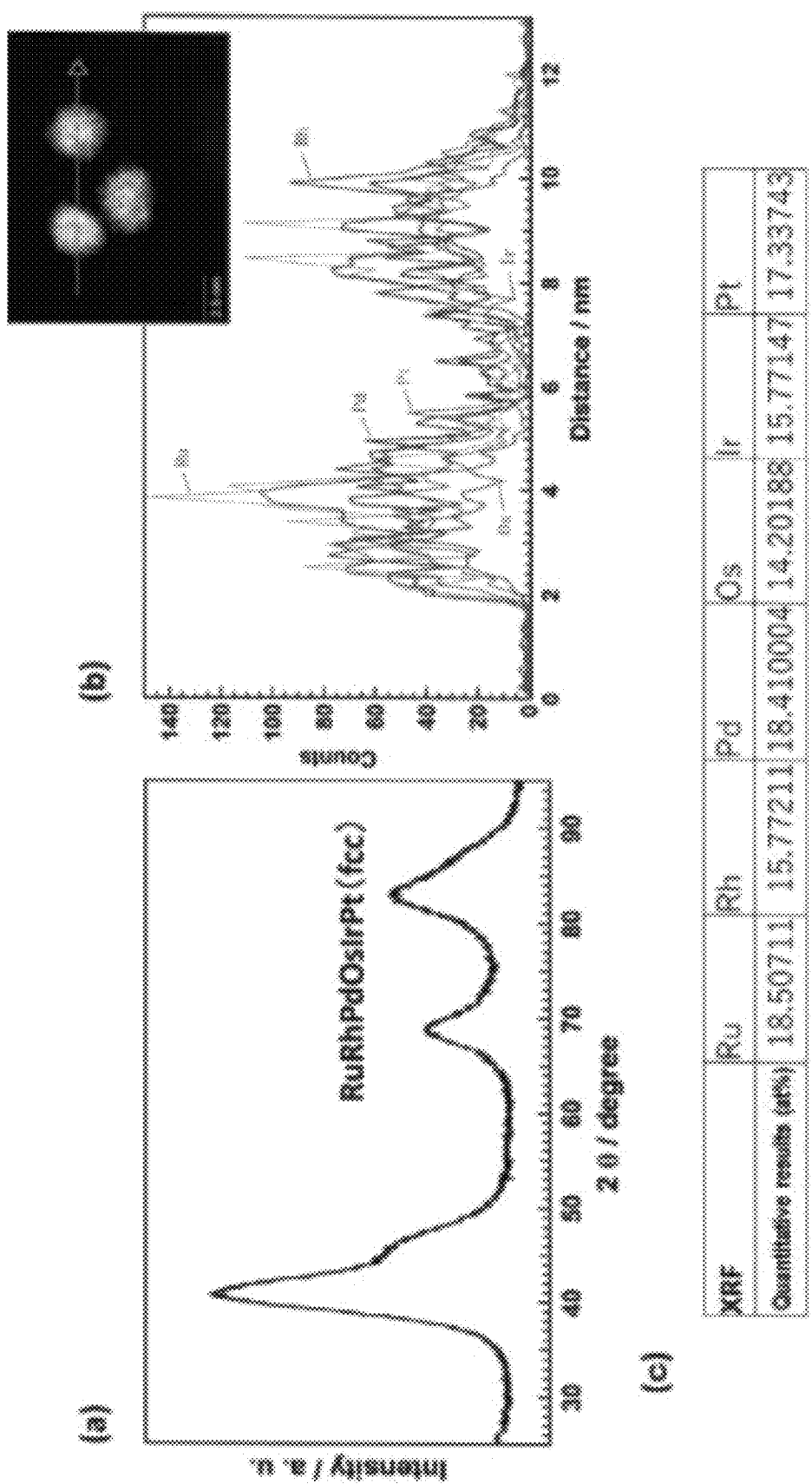
FIG. 3 This shows quantitative analysis results (at %) of the six types of platinum group elements of the platinum group senary solid solution nanoparticles obtained in Example 1 as (a) a powdery X-ray diffraction (PXRD) pattern, (b) an EDS analysis data, and (c) a fluorescent X-ray analysis. This confirms that all the elements exist in each nanoparticle as a solid solution in nearly the same composition. The crystal structure is a single fcc.

A part of the thus-separated platinum group senary solid solution nanoparticles in the form of a solid solution (alloy nanoparticles of Example 1: hereinafter also referred to a PGM-HEA) were analyzed to show EDS maps (FIG. 2), a powdery X-ray diffraction (PXRD) pattern (FIG. 3(a)) and a part of EDS data (FIG. 3(b)) thereof. In addition, the nanoparticles were analyzed through XRF analysis to calculate the metallic composition of the six type of platinum group elements (FIG. 3(c)). From FIG. 2, as far as observation on the STEM images, it is confirmed that all the elements dissolved in solid solution in the alloy nanoparticles. Namely, within the fields of view confirmed in the present Example, it is known that the aggregate of alloy nanoparticles contains 100% by number of alloy nanoparticles of all the five or more (six) types of elements contained in the compounds used in production of the alloy nanoparticles, as constituent elements dissolved in solid solution therein. In addition, it is also known that, of the alloy nanoparticles of the present Example, arbitrary alloy nanoparticles constituting the aggregate contain all the five or more (six) types of elements contained in the compounds used in production of the alloy nanoparticles, as constituent elements therein. From FIG. 3(a), FIG. 3(b) and FIG. 3(c), it is confirmed that all the elements solid-dissolved in each alloy nanoparticle in substantially the same composition. The crystal structure of the alloy nanoparticles was a single fcc.

<Elementary Analysis by STEM-EDS>

The alloy nanoparticles of Example 1 are analyzed by STEM-EDS. By elementary analysis through line scanning using plural fields of view of a scanning transmission electron microscope, the metallic composition of the six types of elements is calculated. An average composition of the nanoparticles is determined.

<XRD Analysis>

Figure 4:
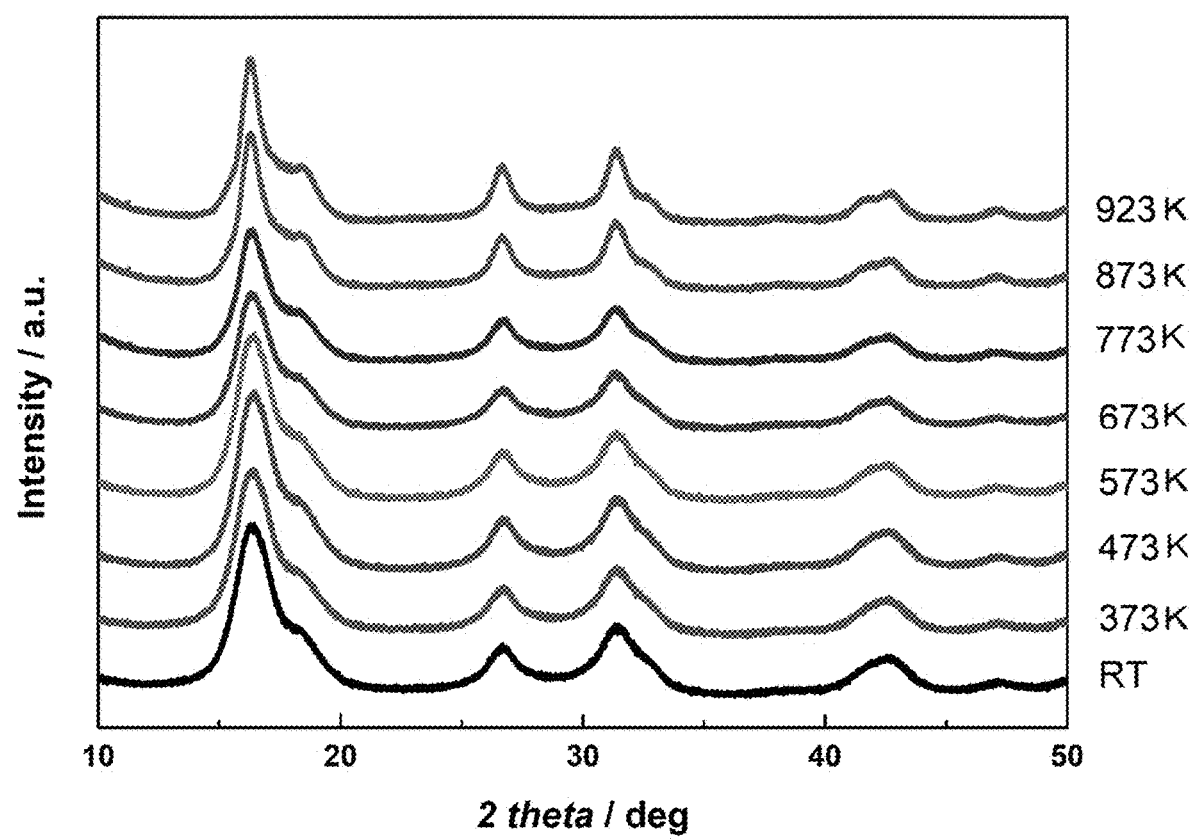
FIG. 4 shows in-situ XRD patterns of the alloy nanoparticles of Example 1.

The alloy nanoparticles obtained in Example 1 were analyzed by in-situ XRD analysis (Spring-8 BL02B2, measurement wavelength 0.6293 (6) angstroms). The resultant data are shown in FIG. 4. From FIG. 4, it is known that the alloy nanoparticles of Example 1 show a stable structure up to 923 K, and have both high substance uniformity and high solid solution uniformity. In particular, it is known that the alloy nanoparticles of Example 1 are excellent in substance uniformity over the nonuniform particles obtained according to the method described in Adv. Funct. Mater. 2019, 1905933.

<TEM>

TEM pictures of the alloy nanoparticles obtained in Example 1 were taken. The average particle diameter of the alloy nanoparticles of Example 1 was 3.1±0.6 nm.

[Example 2] Production of Platinum Group Quinary Solid Solution Nanoparticles

<Preparation of Alloy Nanoparticles>

300 ml of triethylene glycol (TEG) was stirred with heating at 230° C., and a metal ion mixed solution of an ion-exchanged water solution (40 ml) of $K_2PdCl_4$ (0.3 mmol), $RuCl_3 \cdot nH_2O$ (0.3 mmol), $RhCl_3 \cdot 3H_2O$ (0.2 mmol), $IrCl_4 \cdot xH_2O$ (0.1 mmol) and $K_2[PtCl_4]$ (0.1 mmol) was added thereto by spraying, then kept 230° C. for 5 minutes, and left cooled, and the resultant precipitate was separated by centrifugation to give platinum group quinary solid solution nanoparticles RuRhPdIrPt (Ru:Rh:Pd:Ir:Pt (mol %)=28.9:19.6:32.0:10.2:9.30) of alloy nanoparticles of Example 2.

<Elementary Analysis by STEM-EDS>

A part of all the alloy nanoparticles obtained in Example 2 are analyzed by STEM-EDS in the same manner as in Example 1. An average composition of the nanoparticles is determined.

As far as observation on the STEM images, it is confirmed that all the elements dissolved in solid solution in the alloy nanoparticles of the present Example. Namely, within the fields of view confirmed in the present Example, it is known that the aggregate of alloy nanoparticles contains 100% by number of alloy nanoparticles of all the five types of elements contained in the compounds used in production of the alloy nanoparticles, as constituent elements dissolved in solid solution therein. In addition, it is also known that, of the alloy nanoparticles of the present Example, arbitrary alloy nanoparticles constituting the aggregate contain all the five types of elements contained in the compounds used in production of the alloy nanoparticles, as constituent elements therein.

<TEM>

TEM pictures of the alloy nanoparticles obtained in Example 2 were taken. The average particle diameter of the alloy nanoparticles of Example 2 was 6.3±1.1 nm.

Reference Example 1

300 ml of triethylene glycol (TEG) was stirred with heating at 230° C., and an aqueous solution of $K_2PdCl_4$ (0.8 mmol) and $RuCl_3 \cdot nH_2O$ (0.2 mmol) dissolved in ion-exchanged water (40 ml) was added to the resultant solution by spraying, then kept 230° C. for 5 minutes, and left cooled, and the resultant precipitate was separated by centrifugation to give platinum group binary solid solution nanoparticles PdRu (Pd:Ru (mol %)=81.7:18.3).

Experimental Example 1

<Production of Electrode>

A solid solution electrode catalyst (solid solution/C: metal amount 20 wt %) was produced in which the alloy nanoparticles obtained in Examples 1 or 2 or Reference Example 1 were supported on carbon particles.

In water, the synthesized alloy nanoparticles were mixed with carbon particles (Vulcan-XC-72R) in a proportion of 20% by weight, and ultrasonically dispersed to be supported on carbon, then collected by centrifugation and dried to give a catalyst powder. 2.5 mg of the catalyst powder was dispersed in a mixed solution of 6.55 ml of isopropanol and 3.44 ml of water, then 0.01 ml of 5 wt % Nafion (registered trademark) solution (by FUJIFILM Wako Pure Chemical Corporation) was added and fully mixed to give a catalyst ink. An appropriate amount of the ink was applied to a work electrode such as a rotary ring disc electrode or a glassy carbon electrode to produce a catalyst electrode.

<ORR Catalyst Activity>

Current measurement device: Potentiostat (ALS760E, by BAS Inc.)

Figure 5:
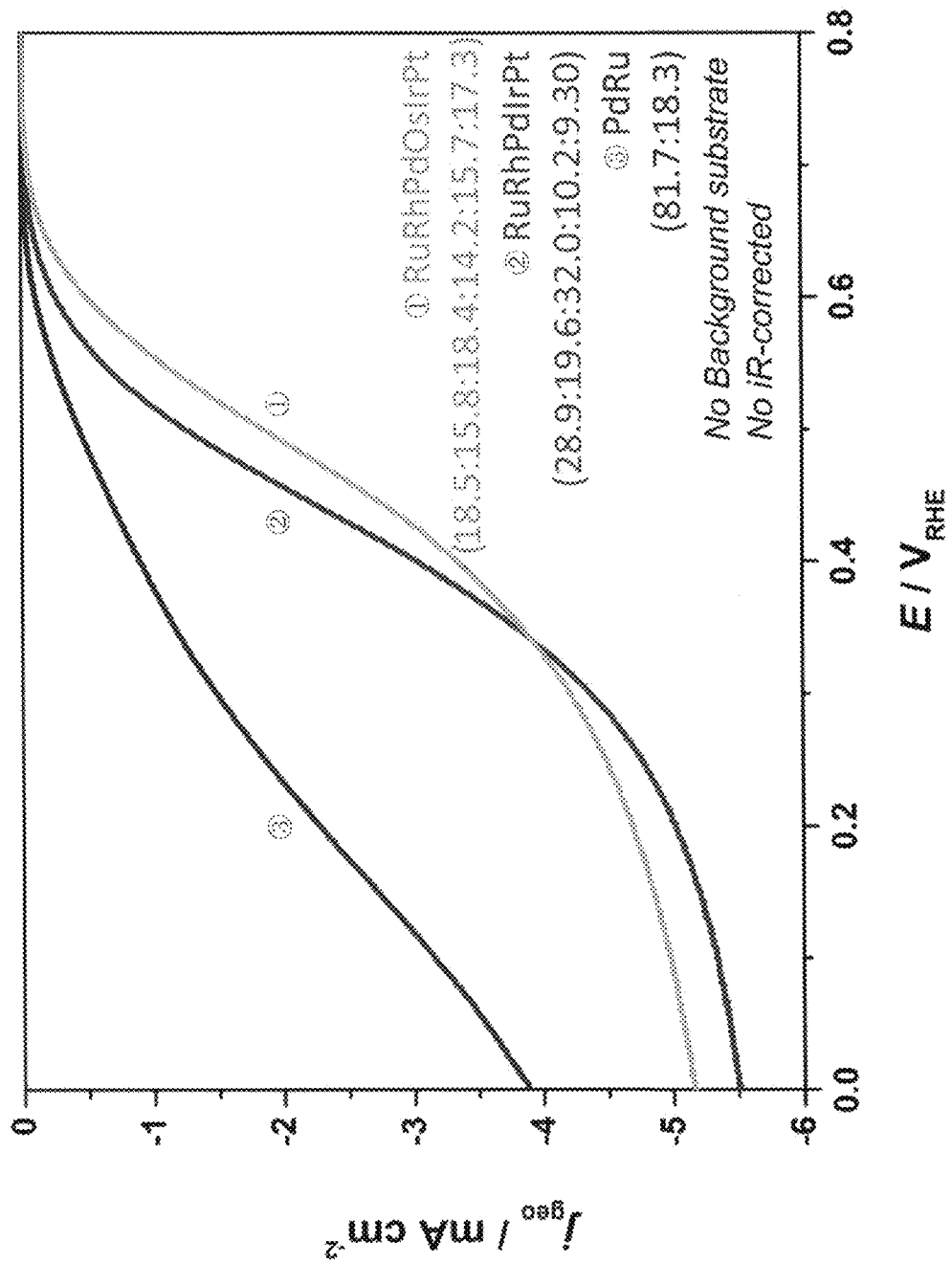
FIG. 5 This shows application of the platinum group senary solid solution nanoparticles obtained in Example 1 to an ORR catalyst.

Measurement method: Using a three-electrode mode cell (counter electrode: platinum wire, reference electrode: silver-silver chloride electrode (Ag/AgCl), electrolytic solution: aqueous 0.1 M $HClO_4$ solution, 25° C., oxygen saturation) in which the cathode was a rotary ring disc electrode having the alloy nanoparticles of Example 1 or 2 or Reference Example 1 supported on carbon particles, the current value I was measured when the potential E was swept from 1.0 V to −0.0 V (vs. RHE) at 5 mV/s, to thereby evaluate the ORR catalyst activity. The results are shown in FIG. 5. From FIG. 5, it is known that the quinary alloy nanoparticles obtained in Example 2 show a higher activity than the binary alloy nanoparticles obtained in Reference Example 1, and show a higher activity than the senary alloy nanoparticles obtained in Example 1.

Experimental Example 2

<Ethylene Glycol Oxidation Electrode Catalyst Reaction>

Current measurement device: Potentiostat (ALS760E, by BAS Inc.)

Figure 6:
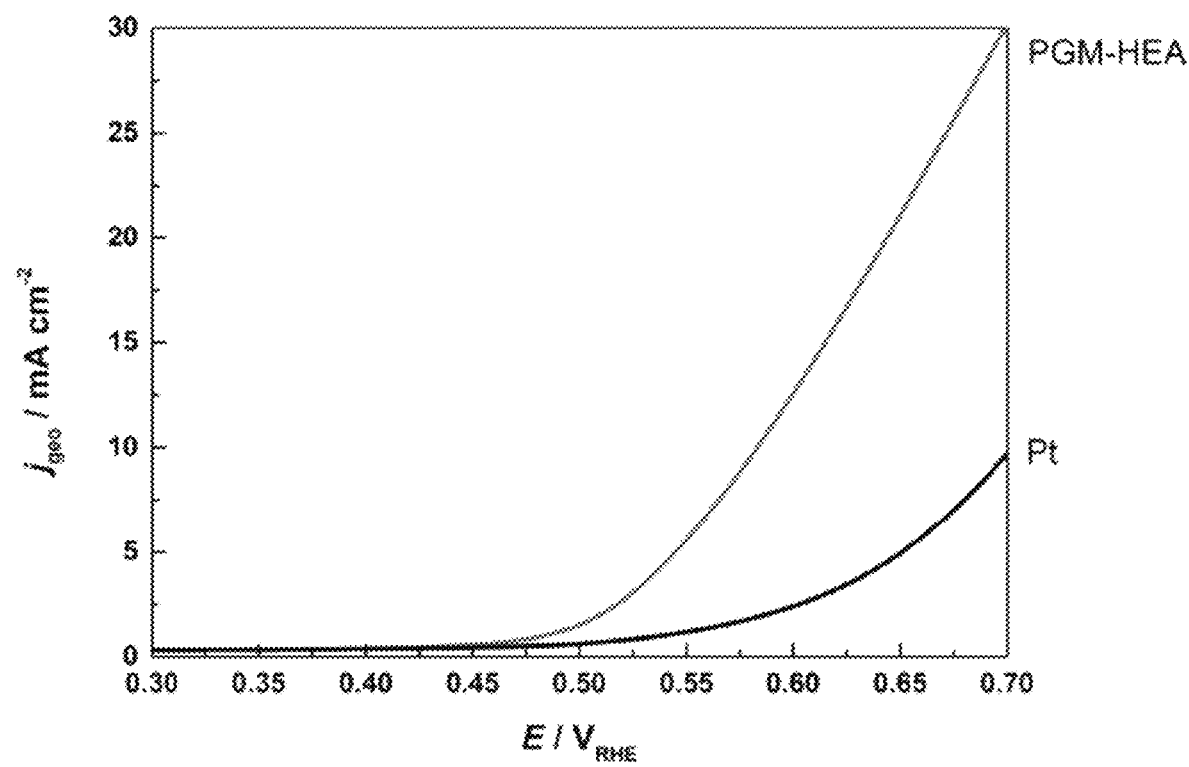
FIG. 6 is a graph relating to a comparison between a commercial Pt/C catalyst and a catalyst of the alloy nanoparticles obtained in Example 1 relative to the current density therebetween in measurement of an ethylene glycol oxidation electrode catalyst activity.

Measurement method: Using a three-electrode mode cell (counter electrode: platinum wire, reference electrode: silver-silver chloride electrode (Ag/AgCl), electrolytic solution: ethylene glycol, 25° C., oxygen saturation) in which the anode was a glassy carbon electrode having the alloy nanoparticles of Example 1 supported on carbon particles, the current density $j_{geo}$ (unit $mA/cm^2$) was measured when the potential E was swept from 0.30 V to 0.70 V (vs. RHE)

at 5 mV/s, to thereby evaluate the ethylene glycol oxidation electrode catalyst activity. The results are shown in FIG. 6. From FIG. 6, it is known that the alloy nanoparticles (PGM-HEA) of Example 1 show a higher activity than the commercial Pt/C catalyst (by Alfa Aesar Corporation).

Experimental Example 3

<Ethanol Oxidation Electrode Catalyst Reaction>

Current measurement device: Potentiostat (ALS760E, by BAS Inc.)

Measurement method: Using a three-electrode mode cell (counter electrode: platinum wire, reference electrode: silver-silver chloride electrode (Ag/AgCl), electrolytic solution: ethanol, 25° C., oxygen saturation) in which the anode was a glassy carbon electrode having the alloy nanoparticles of Example 1 supported on carbon particles, the current density $j_{geo}$ (unit mA/cm$^2$) was measured when the potential E was swept from –0.0 V to 1.10 V (vs. RHE) at 20 mV/s, to thereby evaluate the ethanol oxidation electrode catalyst activity for a total of 50 times. The results of the initial ethanol oxidation electrode catalyst activity are shown in FIG. 7(*a*) to FIG. 7(*d*).

Figures 1, 7:
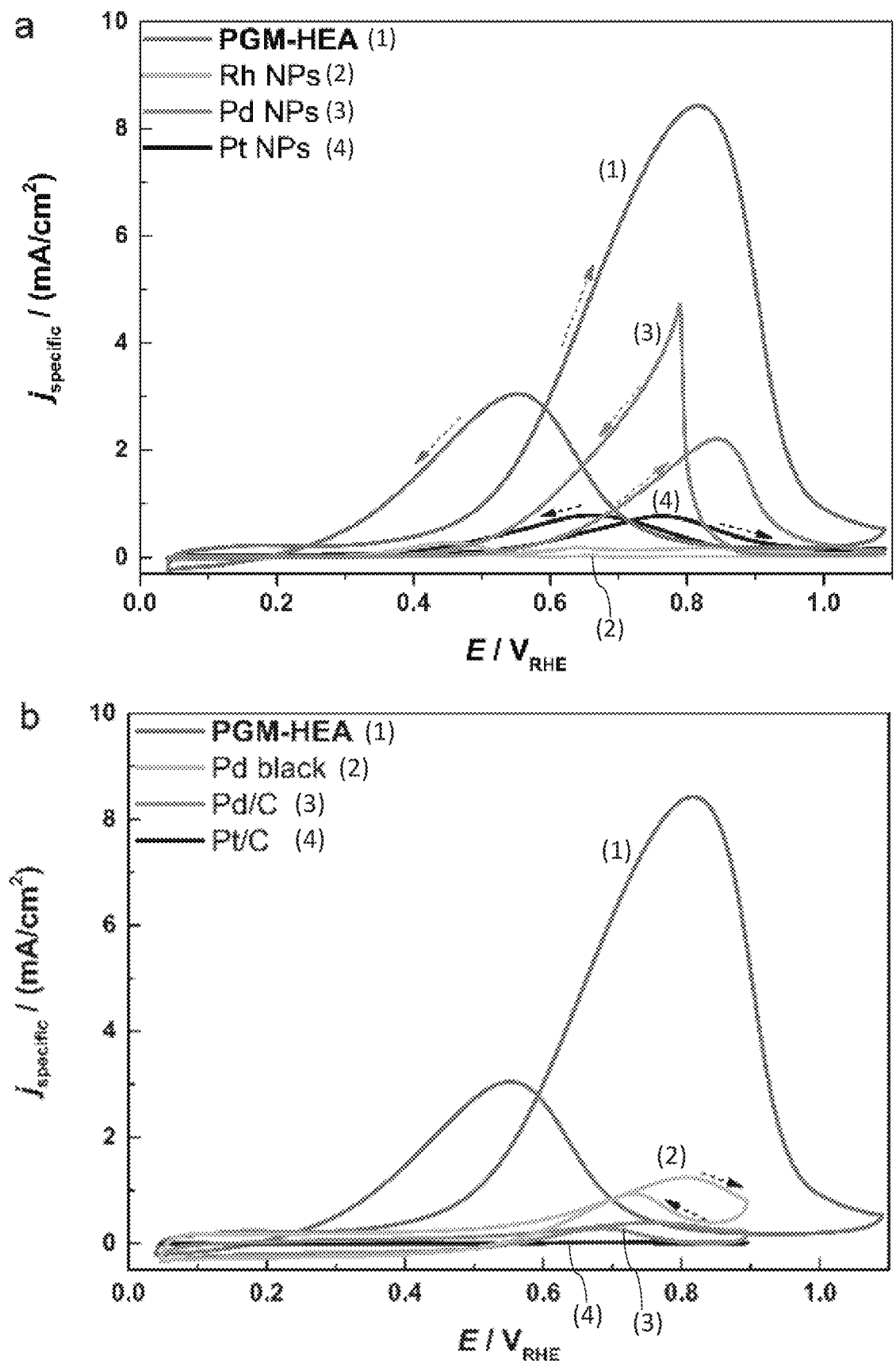
FIG. 7(*a*) is a graph relating to a comparison between element metal (single-component metal) nanoparticles and the alloy nanoparticles obtained in Example 1 relative to the current density therebetween in initial measurement of an ethanol oxidation electrode catalyst activity.
Figures 3, 7:
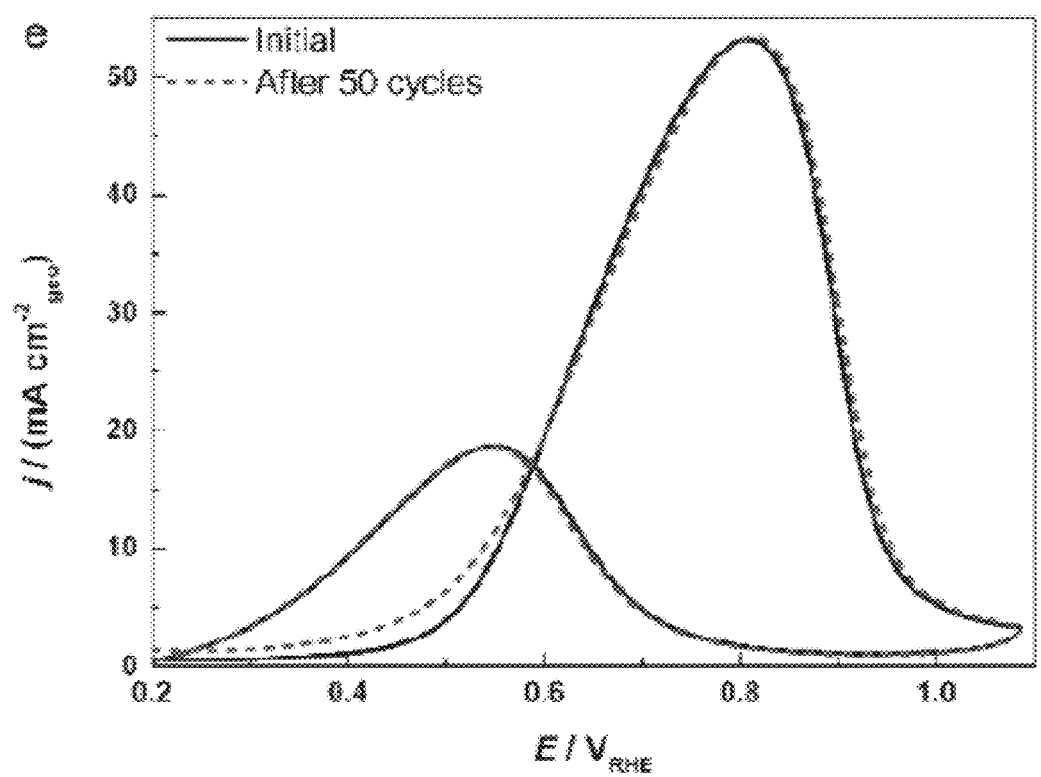

From FIG. 7(*a*), FIG. 7(*b*) and FIG. 7(*c*), it is known that the alloy nanoparticles (PGM-HEA) of Example 1 have a higher activity than Pd.

From FIG. 7(*d*), it is known that the alloy nanoparticles (PGM-HEA) of Example 1 have a higher activity than Au@PtIr/C (J. Am. Chem. Soc. 2019, 141, 24, 9629-9636) which is the reported highest active catalyst. It is also known that the reaction initiation at a low potential suggests a 12 electron reaction.

Also, comparative results between the initial ethanol oxidation electrode catalyst activity and the ethanol oxidation electrode catalyst activity after 50 times are shown in FIG. 7(*e*). From FIG. 7(*e*), it is known that the durability of the alloy nanoparticles (PGA-HEA) of Example 1 is high. Also as compared with that of Pd particles not shown, the durability of the alloy nanoparticles (PGA-HEA) of Example 1 was high.

[Example 3] Production of Platinum Group Quinary Solid Solution Nanoparticles (2)

<Preparation of Alloy Nanoparticles>

300 ml of triethylene glycol (TEG) was stirred with heating at 230° C., and a metal ion mixed solution of a ultra-pure water solution (50 ml) of K$_2$PdCl$_4$ (0.2 mmol), RuCl$_3$·nH$_2$O (0.2 mmol), RhCl$_3$·nH$_2$O (0.2 mmol), H$_2$IrCl$_6$ (0.2 mmol) and K$_2$[PtCl$_4$] (0.2 mmol) was added thereto by spraying, then kept 230° C. for 10 minutes, and left cooled down to room temperature, and the resultant precipitate was separated by centrifugation to give alloy nanoparticles of Example 3.

<Elementary Analysis by STEM-EDS>

A part of all the alloy nanoparticles obtained in Example 3 are analyzed by STEM-EDS in the same manner as in Example 1. An average composition of the nanoparticles is determined.

As far as observation on the STEM images, it is confirmed that all the elements dissolved in solid solution in the alloy nanoparticles of the present Example. Namely, within the fields of view confirmed in the present Example, it is known that the aggregate of alloy nanoparticles contains 100% by number of alloy nanoparticles of all the five types of elements contained in the compounds used in production of the alloy nanoparticles, as constituent elements dissolved in solid solution therein. In addition, it is also known that, of the alloy nanoparticles of the present Example, arbitrary alloy nanoparticles constituting the aggregate contain all the five types of elements contained in the compounds used in production of the alloy nanoparticles, as constituent elements therein.

<TEM>

TEM pictures of the alloy nanoparticles obtained in Example 3 were taken. The average particle diameter of the alloy nanoparticles of Example 3 was 5.5±1.2 nm.

Experimental Example 4

<Ethylene Glycol Oxidation Electrode Catalyst Activity>

An electrode catalyst having the alloy nanoparticles of Example 3 supported on carbon particles (alloy/C: metal amount 20 wt %) was produced. The amount of the nanoparticles was 0.05 mg.

Current measurement device: Potentiostat (ALS760E, by BAS Inc.)

Figure 8:
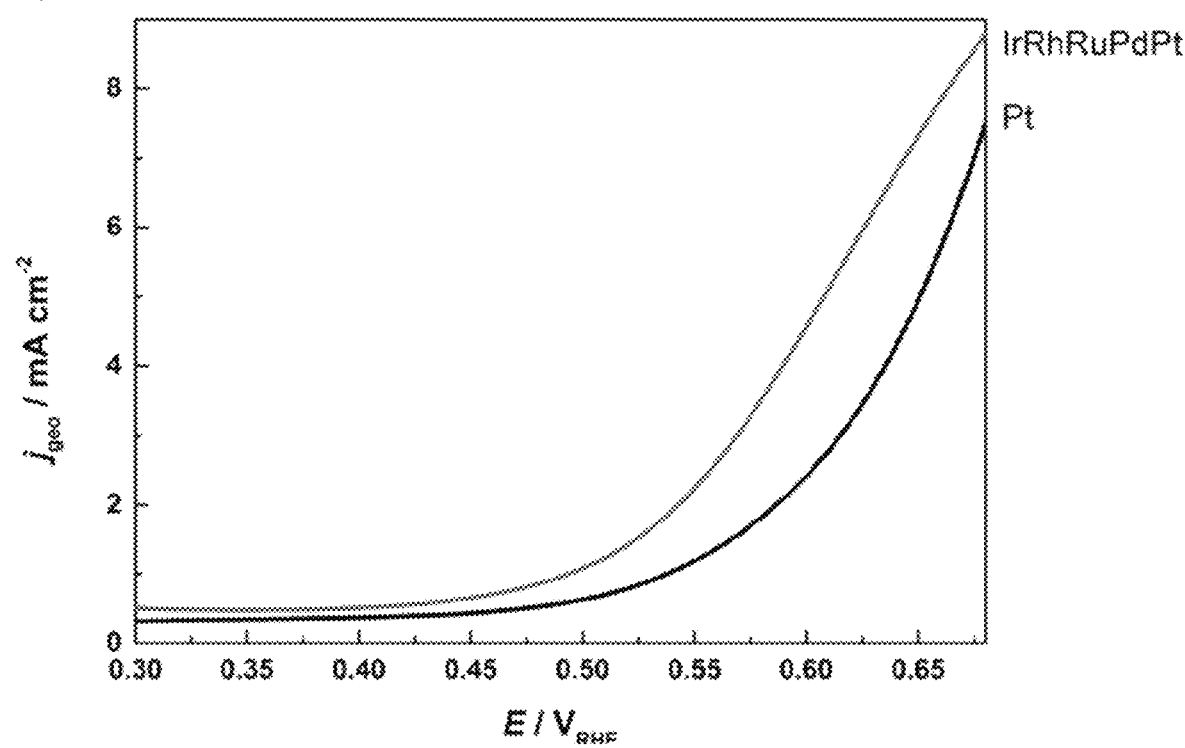
FIG. 8 is a graph relating to a comparison in the current density in measurement of an ethylene glycol oxidation electrode catalyst activity with the alloy nanoparticles obtained in Example 3.

Measurement method: Using a three-electrode mode cell (counter electrode: platinum wire, reference electrode: silver-silver chloride electrode (Ag/AgCl), electrolytic solution: ethylene glycol, 25° C., oxygen saturation) in which the anode was a glassy carbon electrode having the alloy nanoparticles of Example 3 supported on carbon particles, the current density $j_{geo}$ (unit mA/cm$^2$) was measured when the potential E was swept from 0.30 V to 0.70 V (vs. RHE) at 5 mV/s, to thereby evaluate the ethylene glycol oxidation electrode catalyst activity. The results are shown in FIG. 8. From FIG. 8, it is known that the quinary alloy nanoparticles of Example 3 show a higher activity than the commercial Pt/C catalyst (by Alfa Aesar Corporation).

Experimental Example 5

<Hydrogen Generation Electrode Catalyst Activity>

An electrode catalyst having the alloy nanoparticles of Example 3 supported on carbon particles (alloy/C: metal amount 20 wt %) was produced. The amount of the nanoparticles was 0.05 mg.

Current measurement device: Potentiostat (ALS760E, by BAS Inc.)

Figures 1, 9:
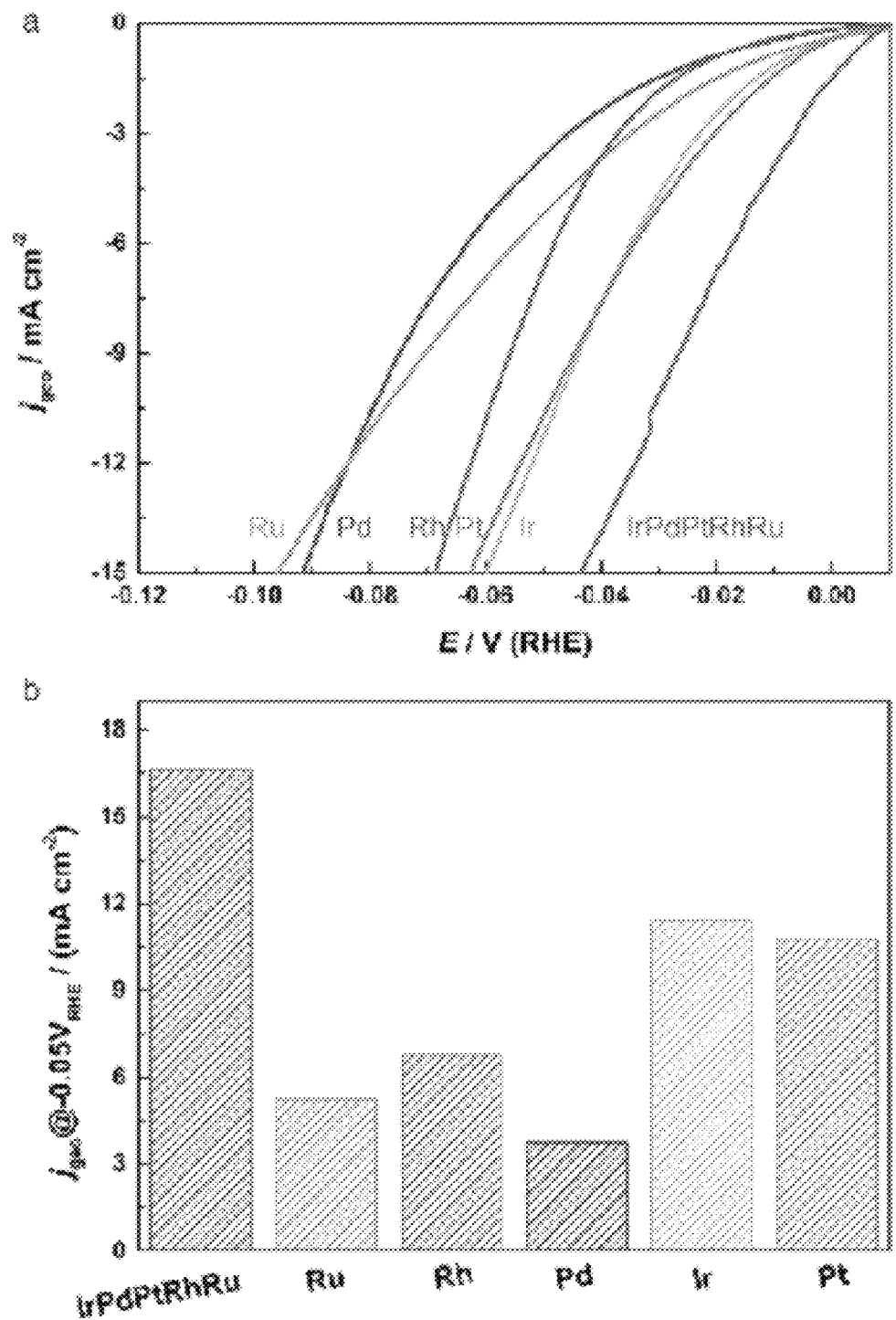
FIG. 9(*a*) is a graph relating to a comparison in the current density in measurement of a hydrogen generation electrode catalyst activity using an aqueous $H_2SO_4$ solution of the alloy nanoparticles obtained in Example 3.
Figure 9:
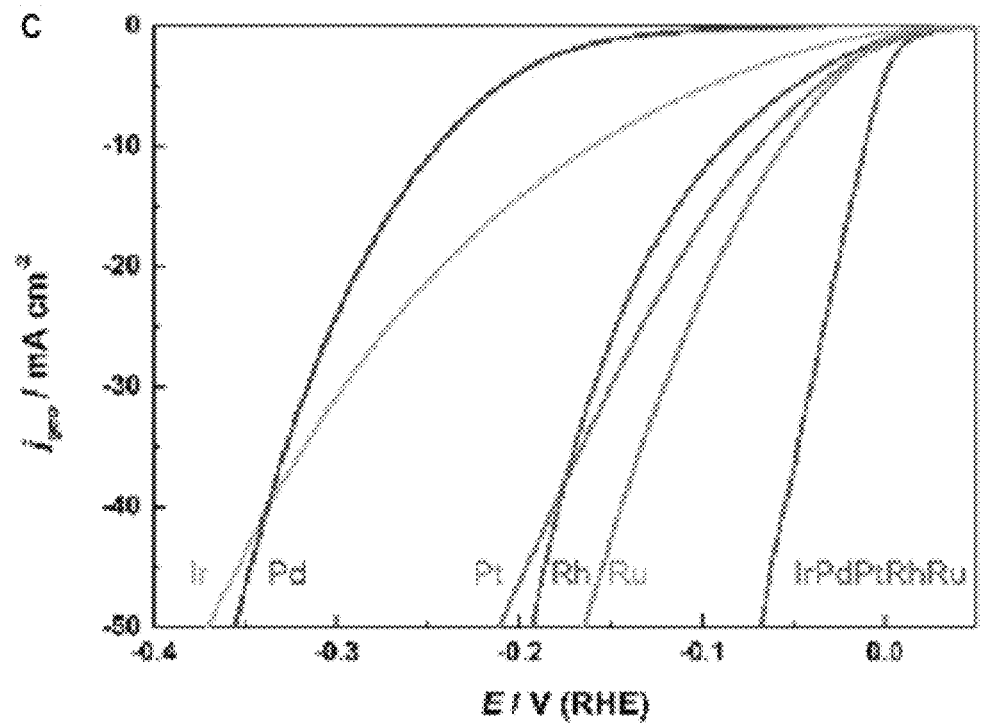
Figure 2:
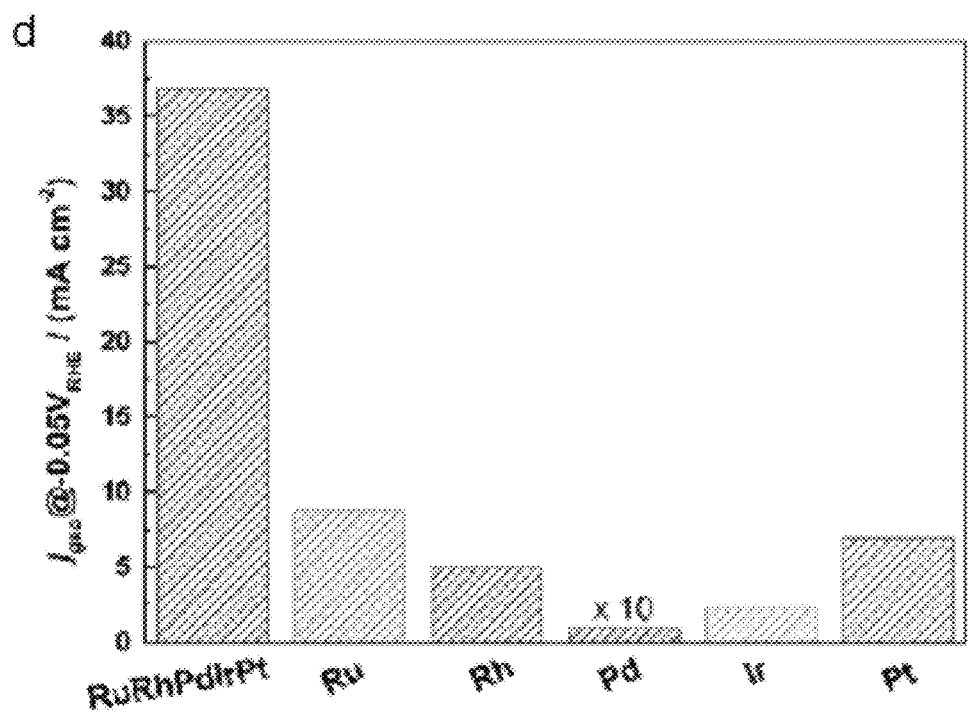

Measurement method: Using a three-electrode mode cell (counter electrode: platinum wire, reference electrode: silver-silver chloride electrode (Ag/AgCl), electrolytic solution: aqueous 0.05 M H$_2$SO$_4$ solution or aqueous 1.0 M KOH solution, 25° C., oxygen saturation) in which the cathode was a rotary ring disc electrode having the alloy nanoparticles of Example 3 supported on carbon particles, the current density $j_{geo}$ (unit mA/cm$^2$) was measured when the potential E was swept from 0.0 V to –0.12 V in FIG. 9(*a*) and from 0.0 V to –0.4 V in FIG. 9(*c*) (both vs. RHE) at 5 mV/s, to thereby evaluate the hydrogen generation electrode catalyst activity. FIG. 9(*a*) and FIG. 9(*b*) show the results of the case using aqueous H$_2$SO$_4$ solution. FIG. 9(*c*) and FIG. 9(*d*) show the results of the case using aqueous KOH solution.

From FIG. 9, it is known that the quinary alloy nanoparticles of Example 3 have a higher activity than the elemental metal both in acidic and alkaline conditions, and have an extremely high chemical durability.

[Example 4] Production of Nonary FeCoNiCuRuRhPdIrPt Solid Solution Nanoparticles in Flow Reactor <Preparation of Alloy Nanoparticles>

0.14 ml of HCl was added to 50 ml of ion-exchanged water to prepare an aqueous hydrochloric acid solution.

$K_2PdCl_4$ (0.05 mmol), $RuCl_3 \cdot nH_2O$ (0.05 mmol), $IrCl_4 \cdot nH_2O$ (0.05 mmol), $K_2PdCl_4$ (0.05 mmol), $RhCl_3 \cdot 3H_2O$ (0.05 mmol), $FeCl_2 \cdot 4H_2O$ (0.05 mmol), $CoCl_2 \cdot 6H_2O$ (0.05 mmol), $CuCl_2 \cdot 2H_2O$ (0.05 mmol), and $NiCl_2 \cdot 6H_2O$ (0.05 mmol) each were individually dissolved in 2 ml of the aqueous hydrochloric acid solution, and mixed to prepare 9 types of metal salt solutions each having a pH of 1.60.

A polyvinyl pyrrolidone (PVP) K30 (5 mmol, by FUJI-FILM Wako Pure Chemical Corporation) was completely dissolved in 20 ml of the aqueous hydrochloric acid solution to prepare a PVP solution.

The nine types of metal salt solutions were mixed in the PVP solution to prepare a raw material solution (metal ion mixed solution). The resultant raw material solution was stored in a raw material solution container.

An aqueous 15.75 mol/L KOH solution was added to an aqueous 25 vol % ethanol solution to prepare a 10.5 mM reducing agent solution, which was stored in a reducing agent solution tank.

Using a flow device (flow reactor), the reducing agent solution was fed from the reducing agent solution tank via a pump A at a preset flow rate of 30 mL/min, and heated with a heater preset at a temperature of 375° C. The metal ion mixed solution was fed from the precursor solution container via a pump B at a rate of 3.0 mL/min, and the two solutions were mixed in the reactor.

Subsequently, the mixed solution was cooled in a cooling zone, and the back pressure of the back pressure valve provided downstream the cooling zone was adjusted to 9.9 to 10.1 MPa, and a product containing alloy nanoparticles was collected. During collecting the alloy nanoparticles, the solution temperature was 285° C.

The solution collected as a product was concentrated with an evaporator, and centrifuged to recover the alloy nanoparticles.

<Elementary Analysis by STEM-EDS)

A part of all the alloy nanoparticles obtained in Example 4 were analyzed by STEM-EDS in the same manner as in Example 1. The results are shown in FIG. 10.

Figure 10:
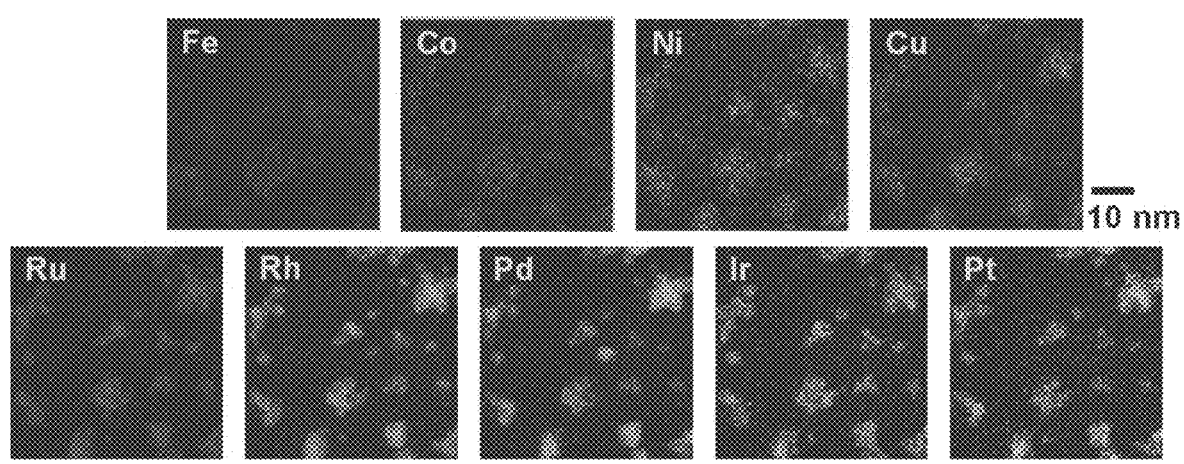
FIG. 10 shows STEM-EDS maps of the alloy nanoparticles obtained in Example 4.

As far as observation on the STEM images in FIG. 10, it is confirmed that all the elements dissolved in solid solution in each alloy nanoparticle. Namely, within the fields of view confirmed in the present Example, it is known that the aggregate of alloy nanoparticles contains 100% by number of alloy nanoparticles of all the nine types of elements contained in the compounds used in production of the alloy nanoparticles, as constituent elements dissolved in solid solution therein. In addition, it is also known that, of the alloy nanoparticles of the present Example, arbitrary alloy nanoparticles constituting the aggregate contain all the nine types of elements contained in the compounds used in production of the alloy nanoparticles, as constituent elements therein.

The invention claimed is:

1. An aggregate containing alloy nanoparticles, wherein the alloy nanoparticles comprise five or more elements of the platinum group and
wherein the alloy nanoparticles are directly supported on a granular carrier selected from the group consisting of oxides, nitrides, carbides, and a granular carbon carrier, with the proviso that the granular carbon carrier is not graphene or carbon fibers.

2. The aggregate containing alloy nanoparticles according to claim 1, wherein the alloy nanoparticles comprise a combination of elements not dissolving in a phase equilibrium diagram in solid solution.

3. The aggregate containing alloy nanoparticles according to claim 1, wherein the alloy nanoparticles comprise said at least five elements of the platinum group and at least one of Ag, Au, Cd, Hg, In, Tl, Sn, Pb, Sb, Bi, Mo, W, Tc, Re, 3d metals (Sc, Ti, V, Cr, Mn, Fe, Co, Ni, Cu, Zn), Ga, Ge, As, H, B, Al, C, Si, N, P, Y, Zr, Nb, lanthanoids, Hf and Ta.

4. The aggregate containing alloy nanoparticles according to claim 1, wherein the alloy nanoparticles comprise said at least five elements of the platinum group and at least one of Ag, Au, Cu, and Ni.

5. The aggregate containing alloy nanoparticles according to claim 1, wherein the proportion of the platinum group elements inside the alloy nanoparticles is 5 atomic % or more.

6. The aggregate containing alloy nanoparticles according to claim 1, wherein the alloy nanoparticles are represented by the following formula (1):

$$Ru_pRh_qPd_rOs_xIr_yPt_z \qquad (1)$$

wherein p+q+r+x+y+z=1; 0≤p, q, r, x, y, z<1; one of p, q, r, x, y, and z is 0, or p, q, r, x, y, and z are all numbers between 0 and 1.

7. The aggregate containing alloy nanoparticles according to claim 1, wherein the average particle diameter of an alloy nanoparticle in the aggregate is 0.5 to 30 nm.

8. The aggregate containing alloy nanoparticles according to claim 1, wherein the content of nanoparticles is 98% or more of the total content of the aggregate.

9. A catalyst containing the aggregate containing alloy nanoparticles of claim 1.

10. The catalyst according to claim 9, wherein arbitrary alloy nanoparticles contained in the catalyst comprise all the five or more elements as the constituent elements.

11. In a method for oxidation electrode catalytic reaction or hydrogen generation electrode catalytic reaction using an electrolytic solution and a catalyst, the improvement wherein the catalyst is a catalyst according to claim 9.

12. The aggregate containing alloy nanoparticles according to claim 1, wherein the alloy nanoparticles comprise nine or more elements.

13. The aggregate containing alloy nanoparticles according to claim 1, wherein the alloy nanoparticles are RuRhPdOsIrPt particles, RuRhPdIrPt particles or FeCoNiCuRuRhPdIrPt particles.

14. The aggregate containing alloy nanoparticles according to claim 1, wherein the alloy nanoparticles consist of Rh, Ru, Os, Ir, and Pt, and at least one of Au, Ag, Mo, W, Re, Fe, Co, Ni, Cu, C, N and B.

15. The aggregate containing alloy nanoparticles according to claim 1, wherein the alloy nanoparticles consist of Rh, Pd, Os, Ir, and Pt, and at least one of Au, Ag, Mo, W, Re, Fe, Co, Ni, Cu, C, N and B.

16. A production method for obtaining an aggregate containing alloy nanoparticles, wherein the alloy nanoparticles comprise five or more elements of the platinum group, comprising adding an aqueous solution comprising salts of five or more elements of the platinum group to a liquid reducing agent heated up to 200° C. to 300° C. and reacting them, and causing the alloy nanoparticles to be directly supported on a granular carrier selected from the group consisting of oxides, nitrides, carbides, and a granular carbon carrier, with the proviso that the granular carbon carrier is not graphene or carbon fibers.

\* \* \* \* \*